Figure 1:
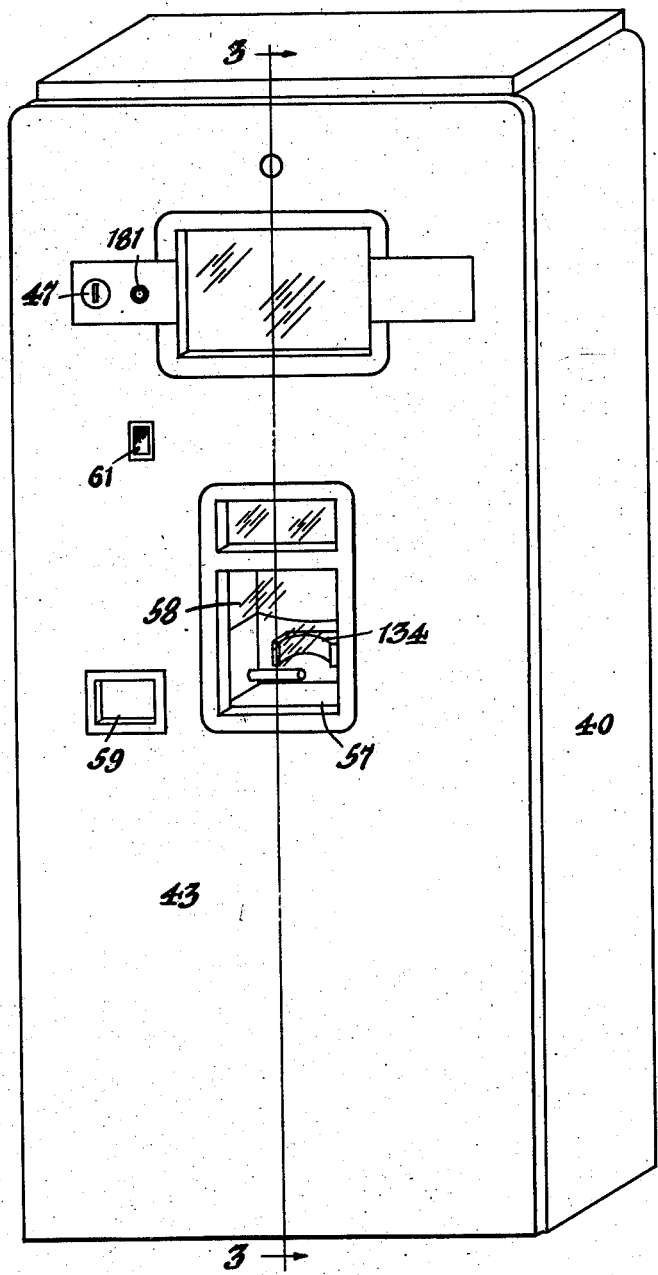

April 7, 1953     W. VON STOESER     2,633,959
VENDING MACHINE
Filed Feb. 25, 1943                          16 Sheets-Sheet 1

INVENTOR
*Walter Von Stoeser*,
BY
*Walter P. Guyer*
ATTORNEY

April 7, 1953 W. VON STOESER 2,633,959
VENDING MACHINE
Filed Feb. 25, 1943 16 Sheets-Sheet 3

INVENTOR
Walter Von Stoeser,
BY
Walter P. Geyer
ATTORNEY

April 7, 1953 W. VON STOESER 2,633,959
VENDING MACHINE
Filed Feb. 25, 1943 16 Sheets-Sheet 4

INVENTOR
Walter Von Stoeser,
BY Walter P. Geyer
ATTORNEY

April 7, 1953 W. VON STOESER 2,633,959
VENDING MACHINE
Filed Feb. 25, 1943 16 Sheets-Sheet 5
FIG. 6.
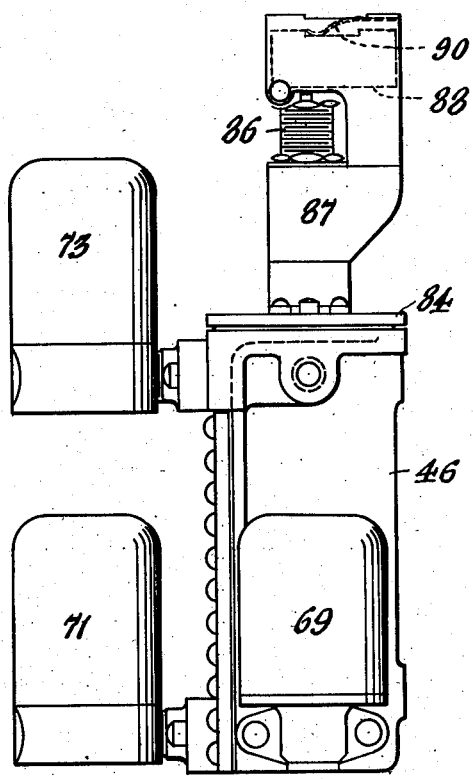
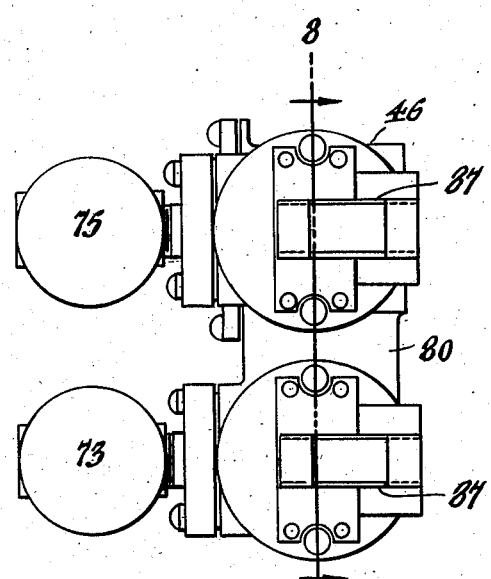
FIG. 7.
INVENTOR
Walter Von Stoeser,
BY Walter P. Geyer
ATTORNEY

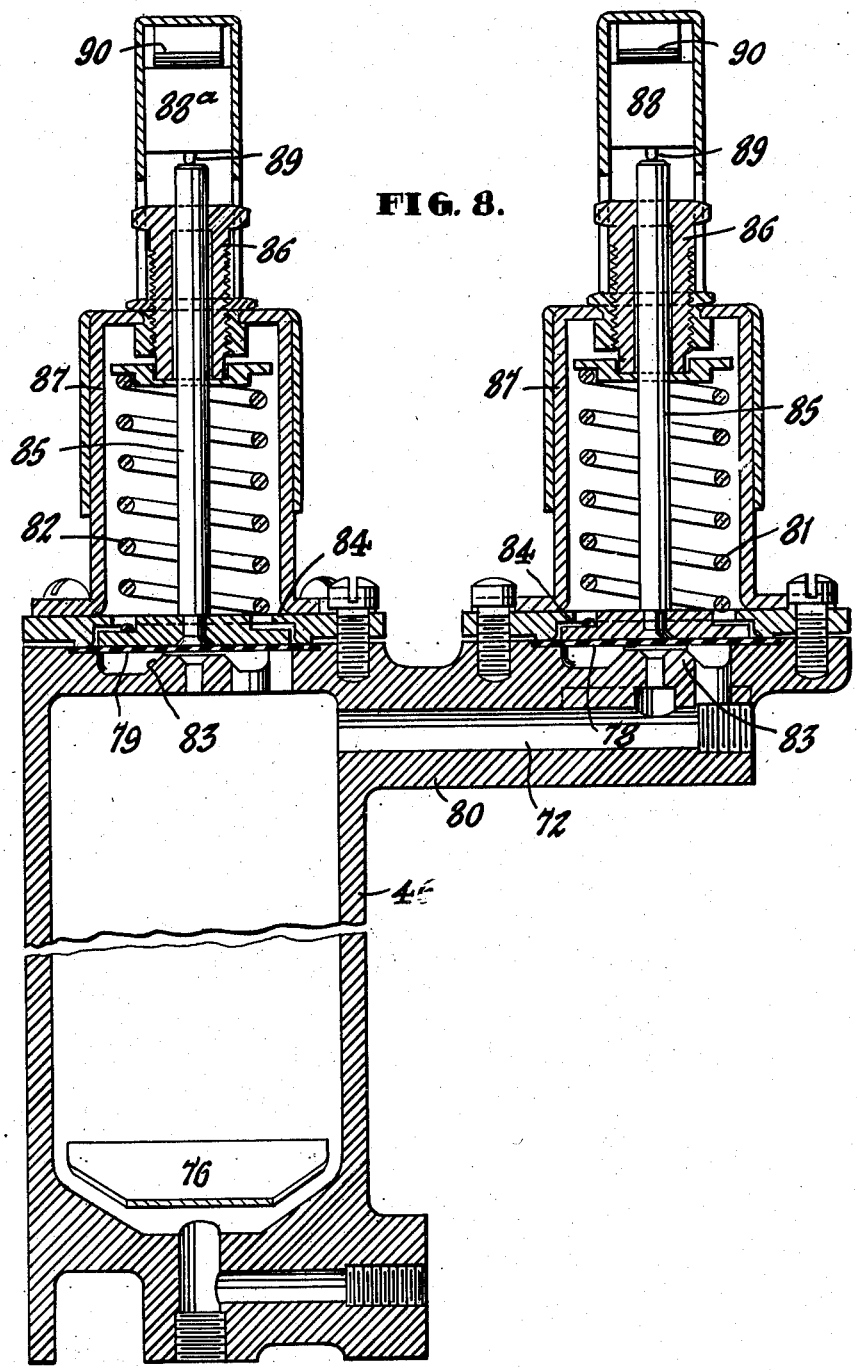

April 7, 1953 W. VON STOESER 2,633,959
VENDING MACHINE
Filed Feb. 25, 1943 16 Sheets-Sheet 7

INVENTOR
Walter Von Stoeser,
BY
Walter P. Geyer
ATTORNEY

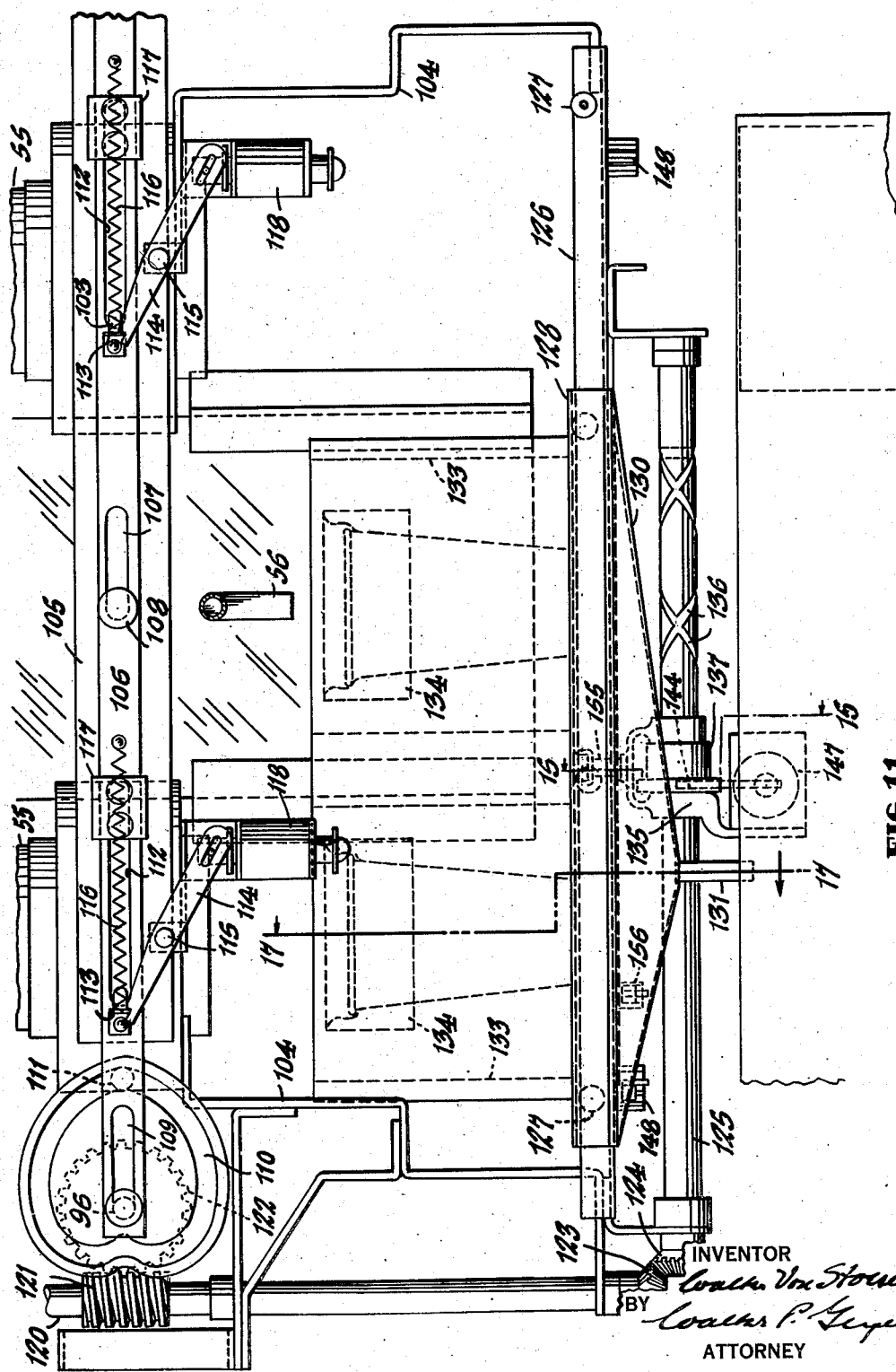

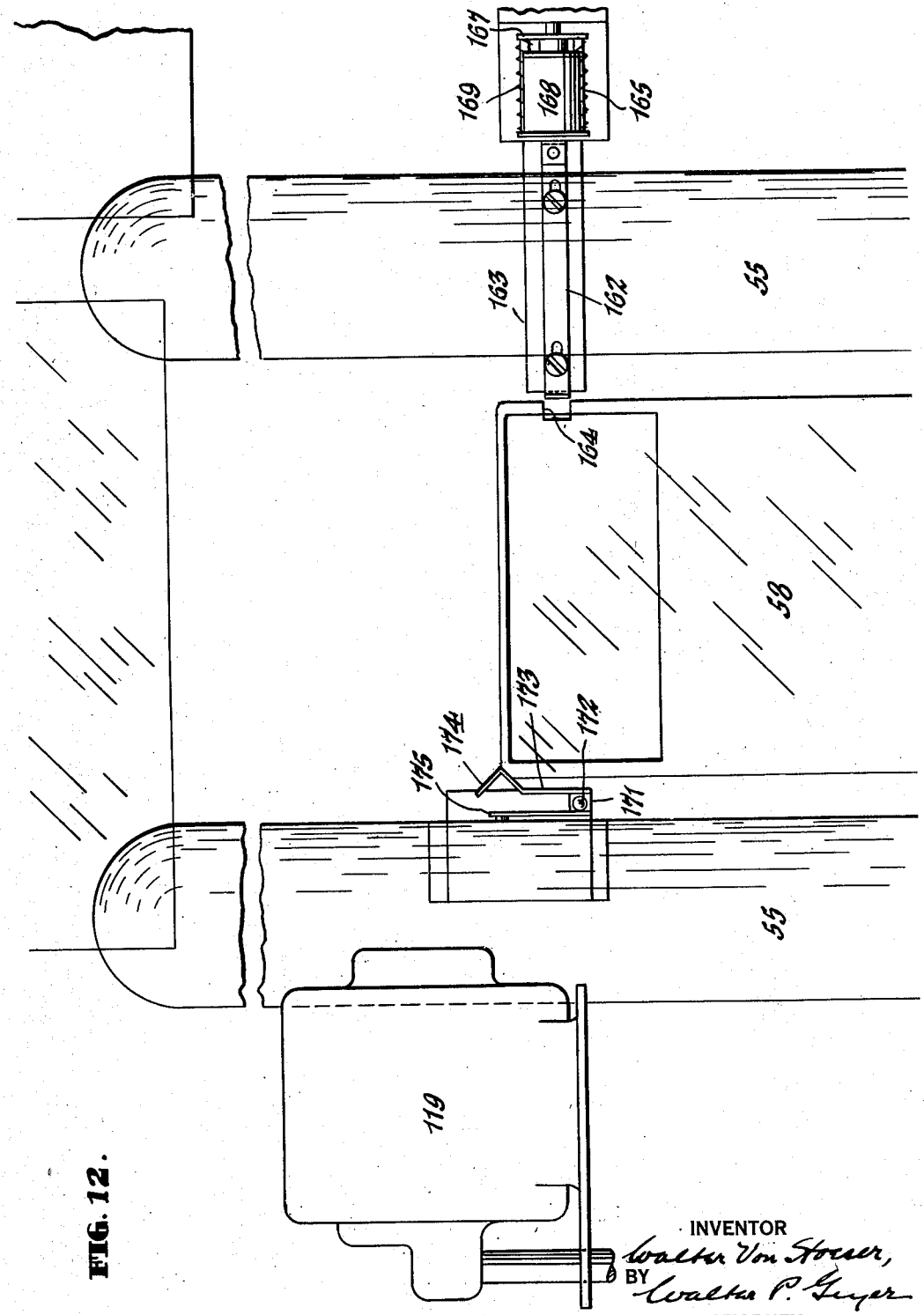

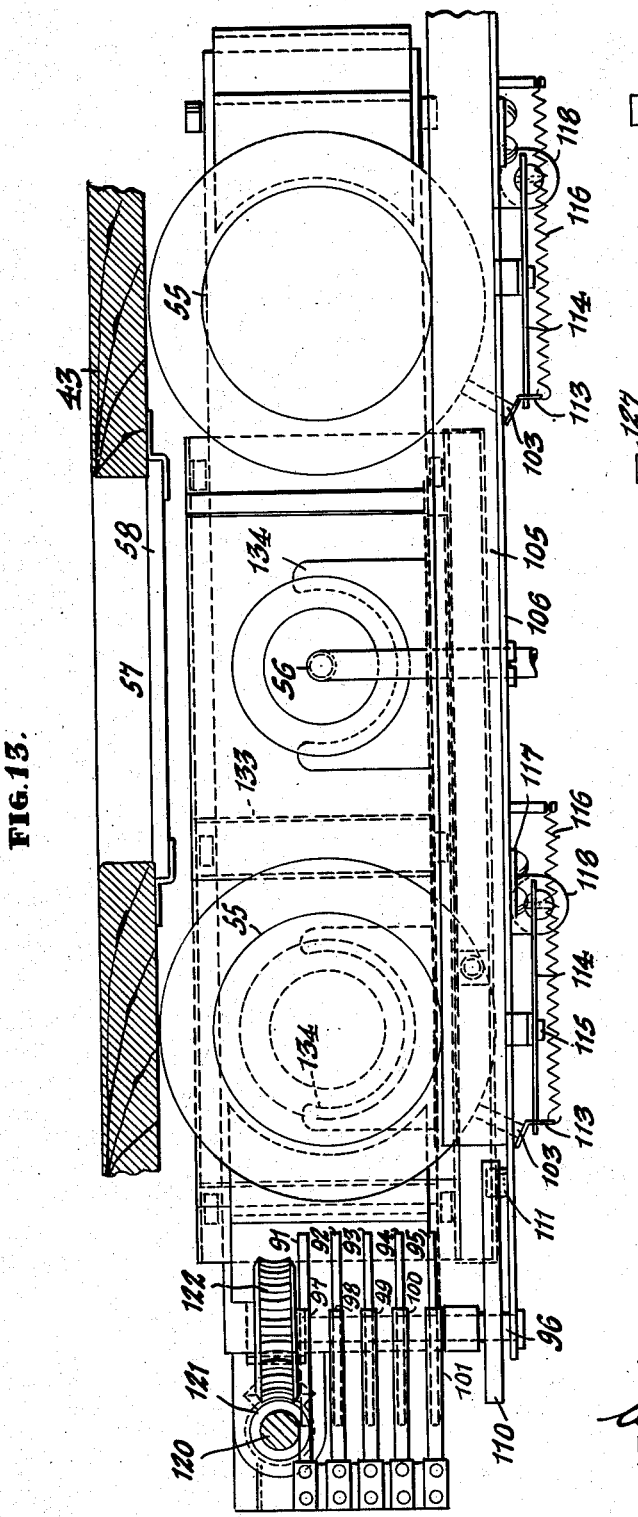
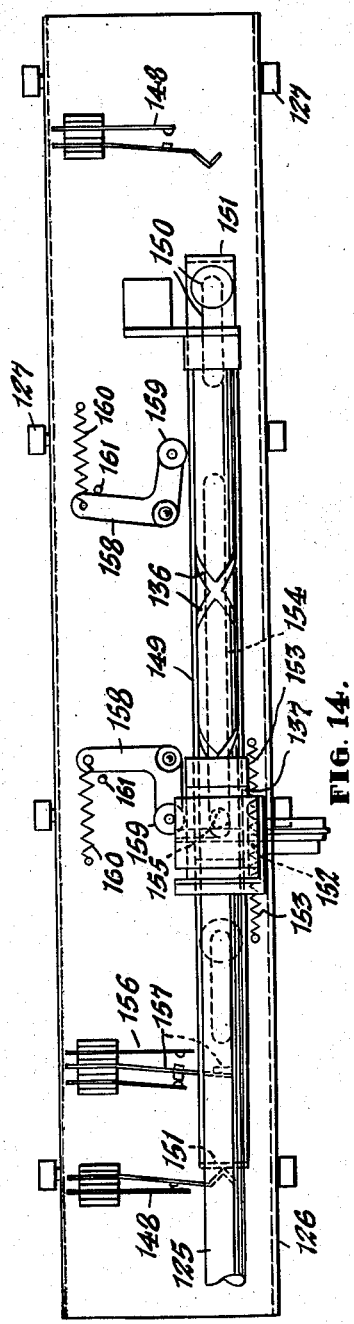

April 7, 1953     W. VON STOESER     2,633,959
VENDING MACHINE
Filed Feb. 25, 1943     16 Sheets-Sheet 11

INVENTOR
Walter Von Stoeser,
BY Walter P. Geyer
ATTORNEY

April 7, 1953          W. VON STOESER          2,633,959

VENDING MACHINE

Filed Feb. 25, 1943                                  16 Sheets-Sheet 12

INVENTOR
Walter Von Stoeser,
BY
Walter P. Geyer
ATTORNEY

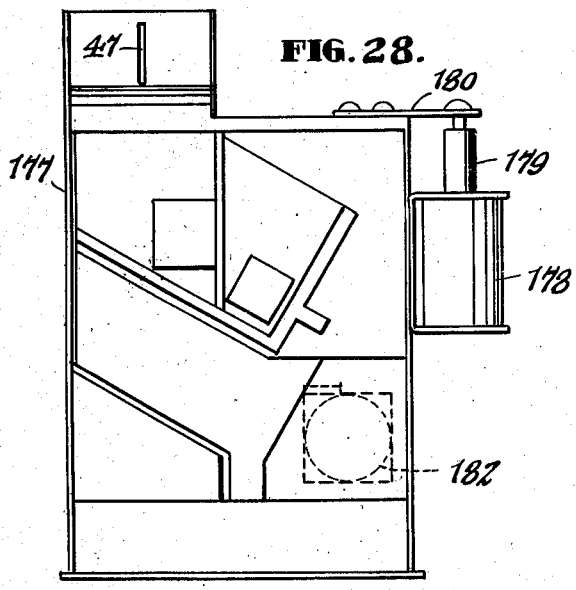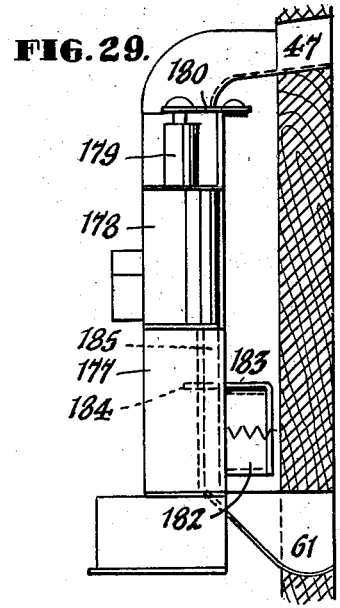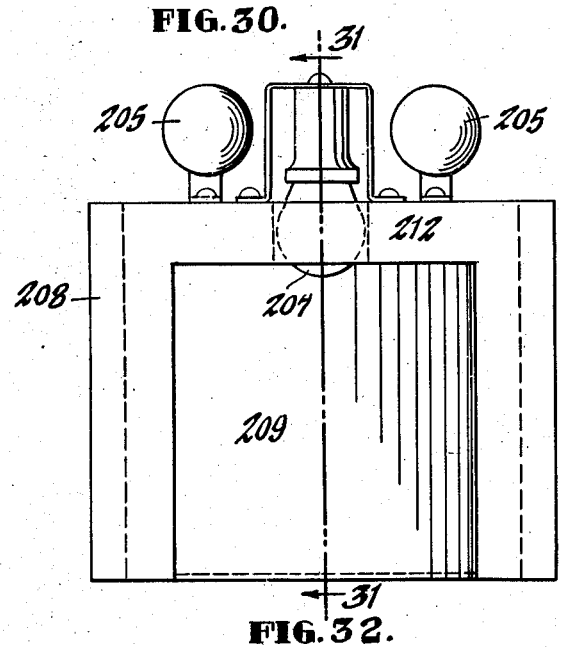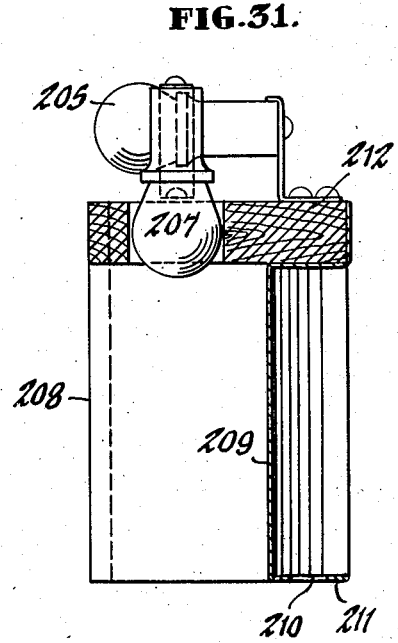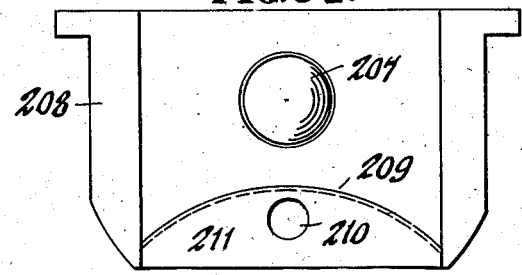

April 7, 1953 W. VON STOESER 2,633,959
VENDING MACHINE
Filed Feb. 25, 1943 16 Sheets-Sheet 14

INVENTOR
Walter Von Stoeser,
BY
Walter P. Guyer
ATTORNEY

April 7, 1953  W. VON STOESER  2,633,959
VENDING MACHINE

Filed Feb. 25, 1943  16 Sheets-Sheet 15

INVENTOR
Walter Von Stoeser,
BY Walter P. Geyer
ATTORNEY

April 7, 1953 W. VON STOESER 2,633,959
VENDING MACHINE
Filed Feb. 25, 1943 16 Sheets-Sheet 16

INVENTOR
Walter Von Stoeser,
BY
Walter P. Geyer
ATTORNEY

Patented Apr. 7, 1953

2,633,959

UNITED STATES PATENT OFFICE 2,633,959

VENDING MACHINE

Walter Von Stoeser, Kenmore, N. Y., assignor to The Rudolph Wurlitzer Company, North Tonawanda, N. Y., a corporation of Ohio Application February 25, 1943, Serial No. 477,068

23 Claims. (Cl. 194—13)

This invention relates generally to certain new and useful improvements in vending machines and more particularly to a coin-operated machine for dispensing beverages.

One of its objects is to provide a machine of this character which is so designed and constructed as to deliver a predetermined quantity of the beverage into a cup or like receptacle upon the deposit of a coin, and, in the case of a carbonated beverage, to deliver the same to the customer in a uniform quantity, in a uniformly charged condition, and at a uniform temperature.

Another object of the invention is to provide a novel means for delivering the beverage to a measuring or metering chamber and for discharging it therefrom in such a manner that the carbon dioxide charge will not be lost or dissipated and that during the pouring of the beverage the usual attending turbulence will be reduced to a minimum.

Another object is to provide the machine with a fluid-pressure controlled measuring system which can be adjusted to vary the amount of beverage to be discharged for a given coin deposited in the machine.

A still further object is to provide a beverage dispenser adapted for use with either charged or uncharged beverages which is designed to permit the pouring of drinks in rapid sequence at a uniform temperature, and which is sanitary and so organized that its various parts are inaccessible to the public and meddling eliminated.

Another object is to provide the machine with means for automatically stopping its operation when the beverage-content in the machine reaches a predetermined amount, and which will thereafter cause the return of any deposited coins to the patron.

The invention has for a further object to provide positive means for rendering the machine inoperative under other conditions, as when a patron is removing a cup of the beverage from the machine, at which time any coins deposited by other patrons will be returned to them until a door or closure at the filling station of the machine has been fully closed and automatically locked.

A still further object is to provide a machine with an indicator or counting mechanism designed to indicate at a glance, to the proprietor or owner of the machine, the number of drinks which remain in the beverage reservoirs at any time and to give a warning alarm when the beverage content in the machine reaches a predetermined minimum.

Other features of the invention reside in the construction and arrangement of parts hereinafter described and particularly pointed out in the appended claims.

Figure 2:
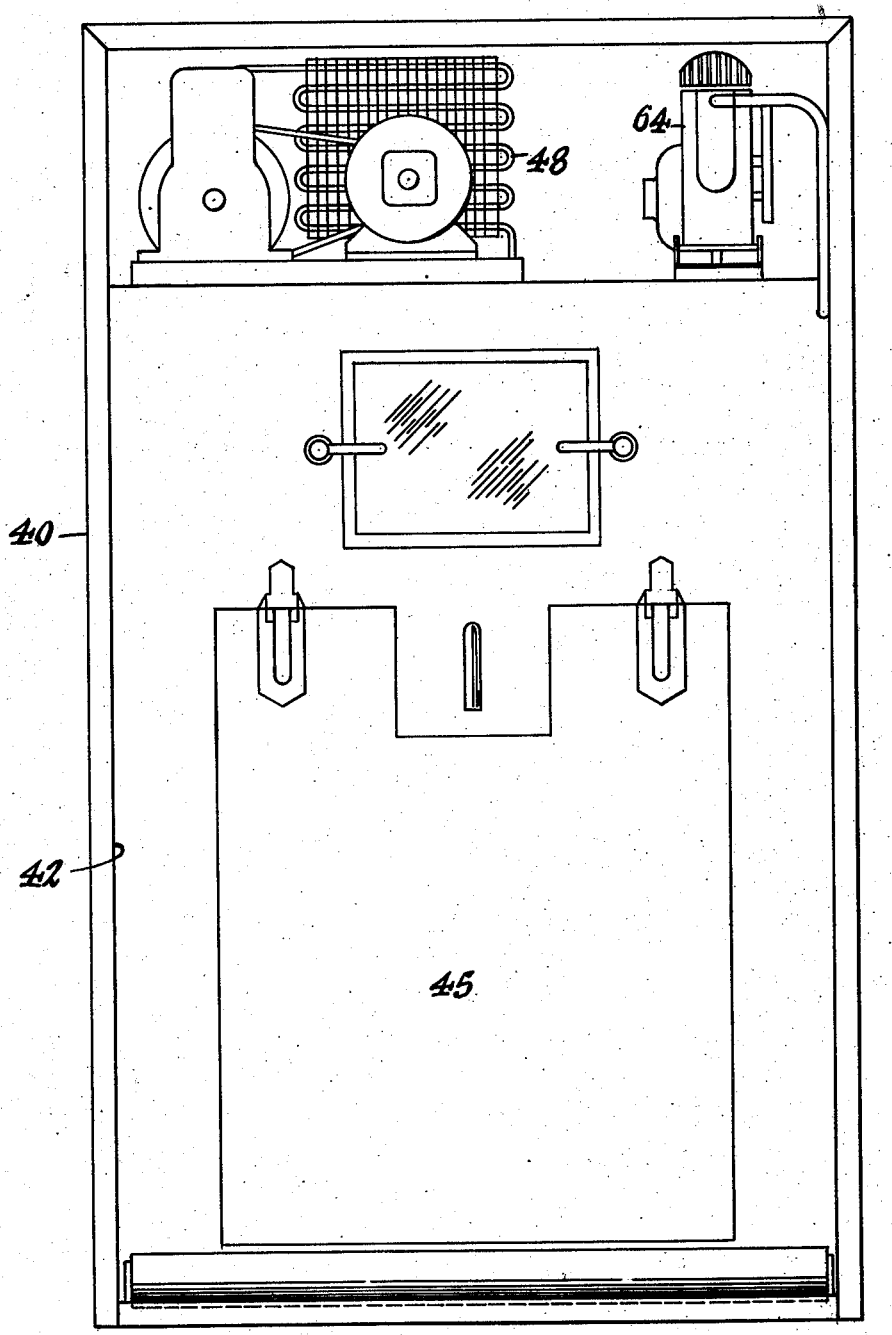
Figure 3:
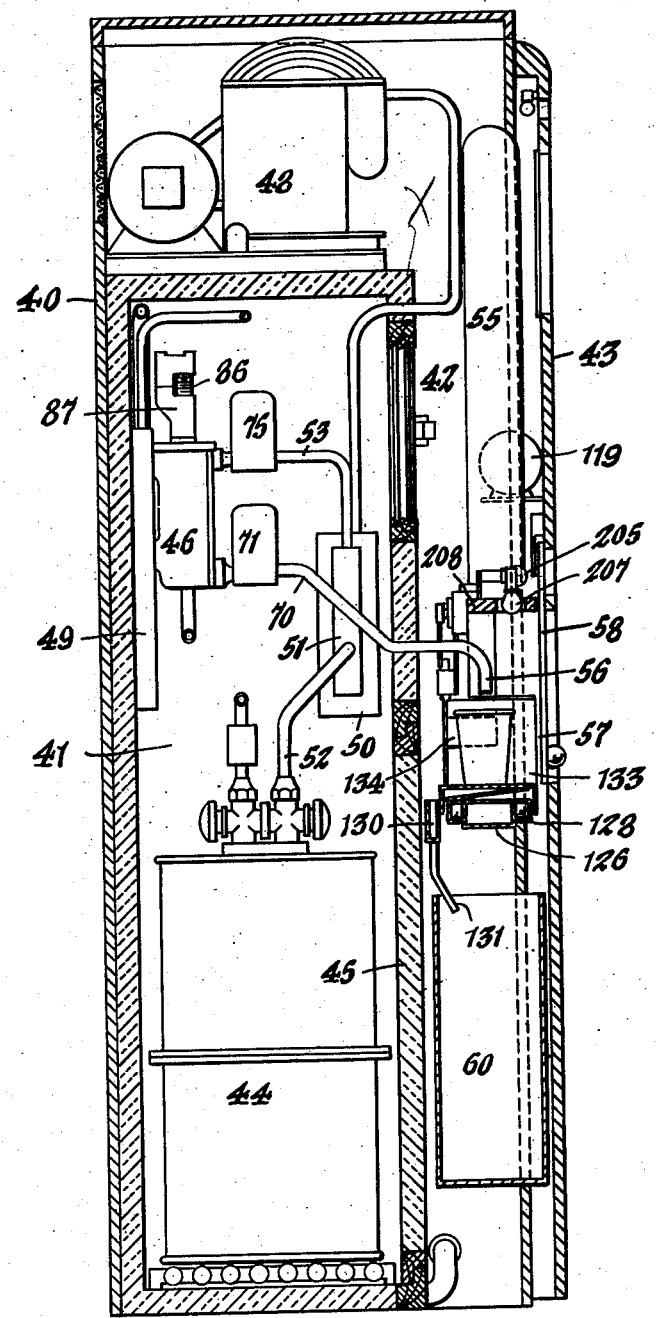
Figure 4:
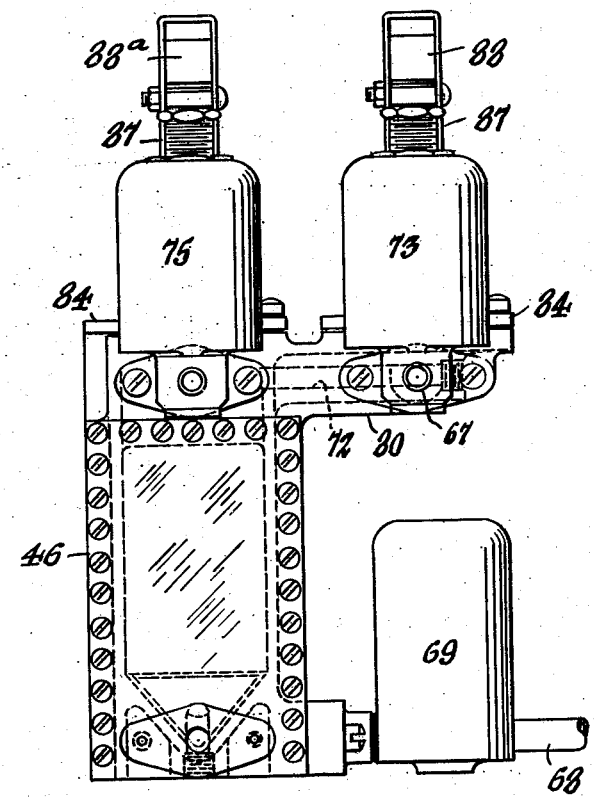
Figure 5:
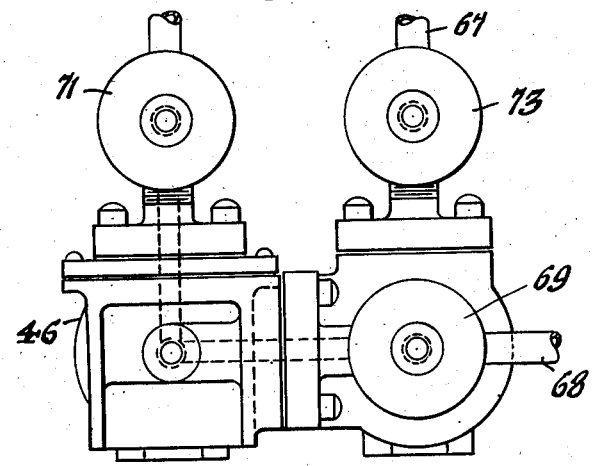
Figures 9, 10:
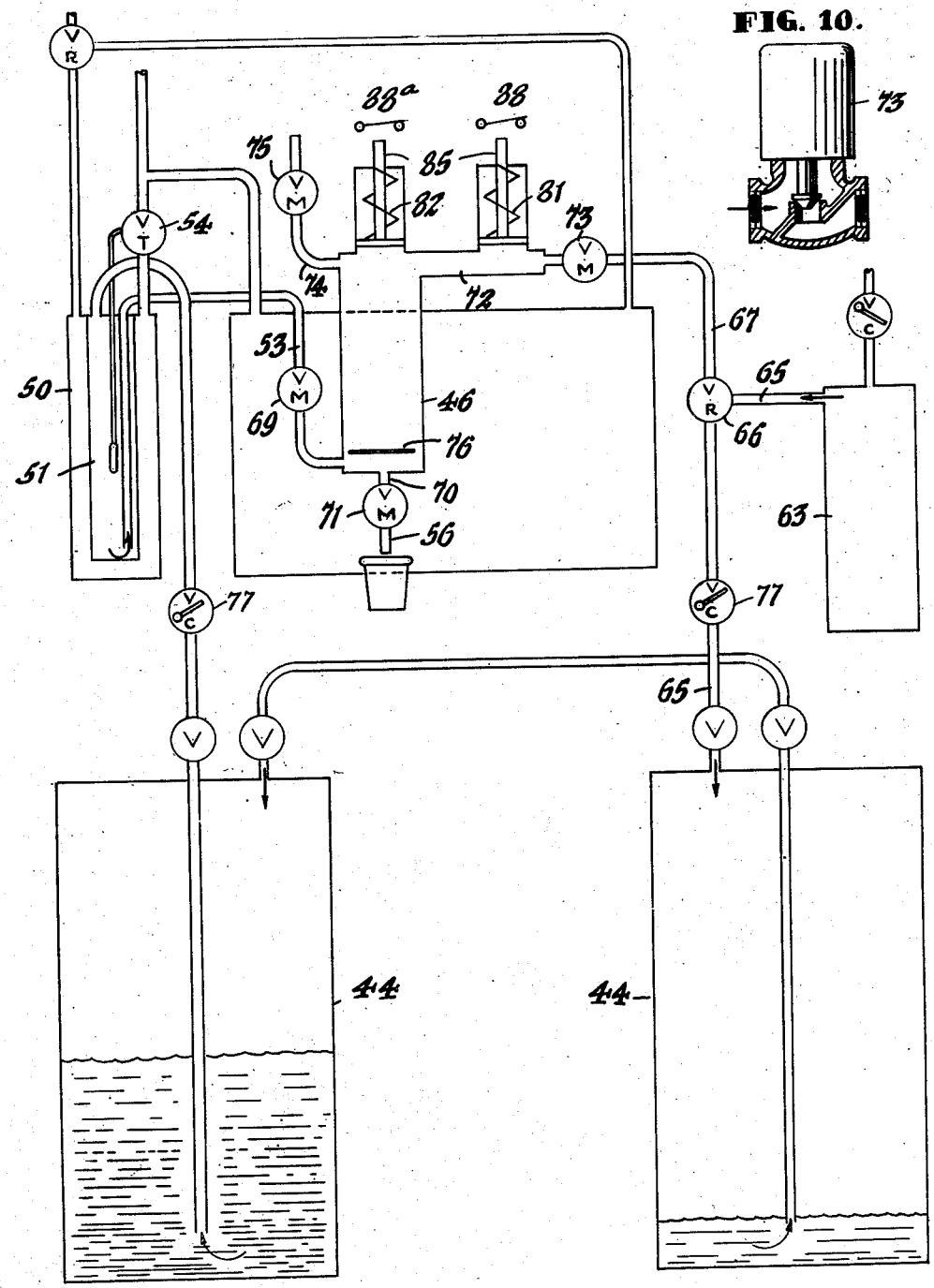
Figure 15:
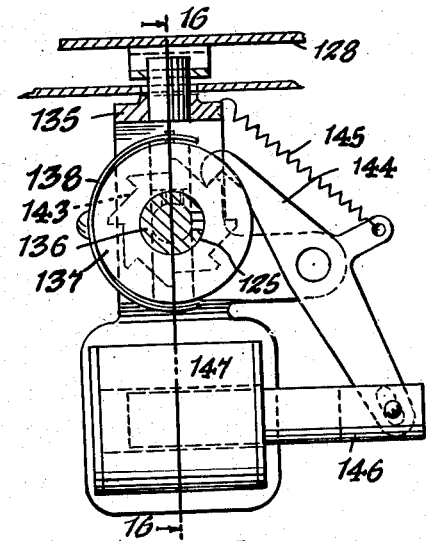
Figure 16:
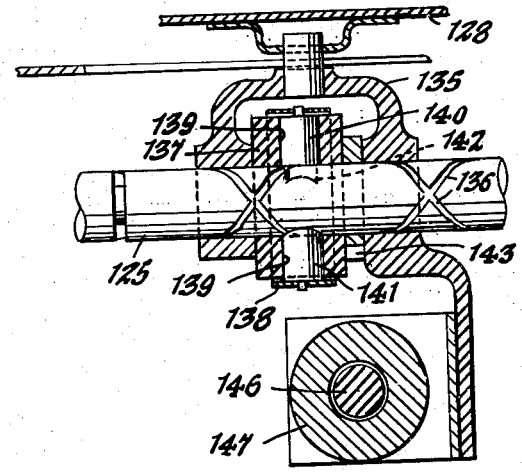
Figure 17:
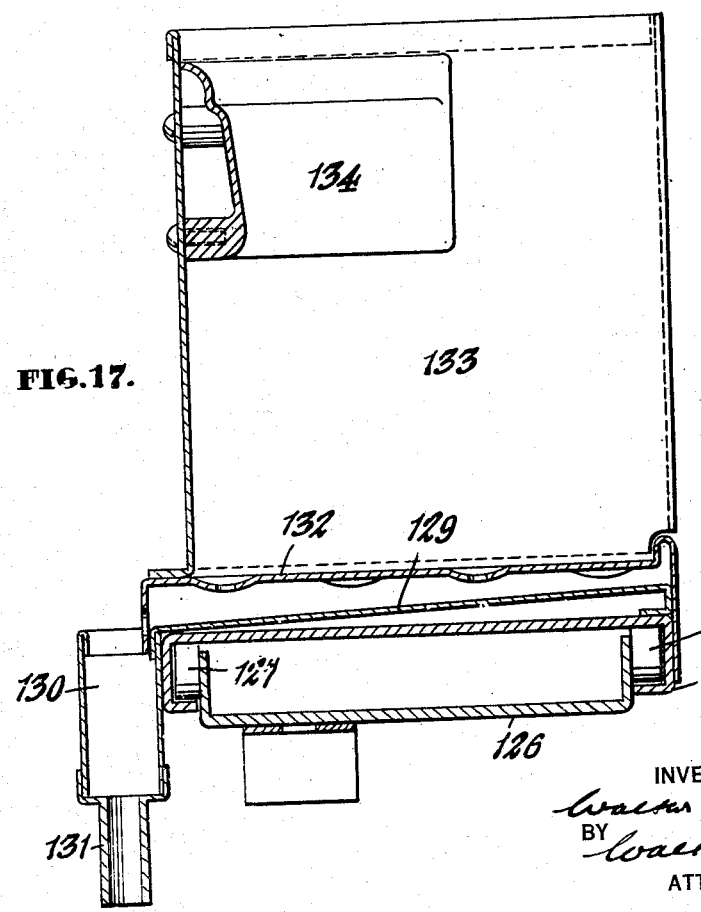
Figure 18:
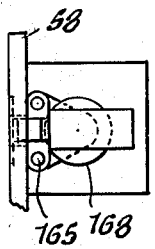
Figure 19:
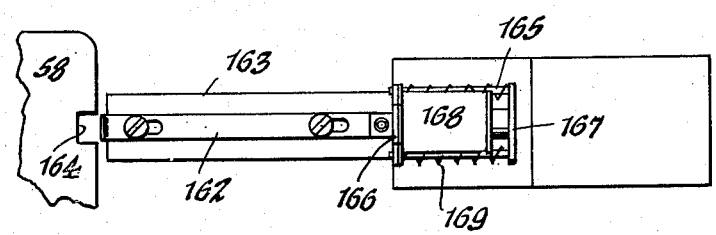
Figure 20:
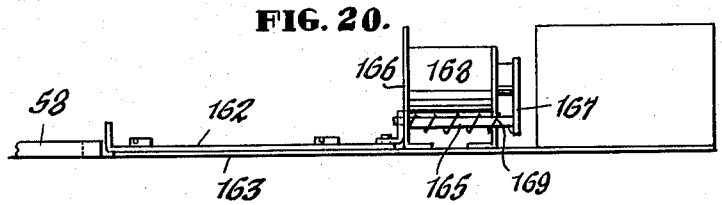
Figure 21:
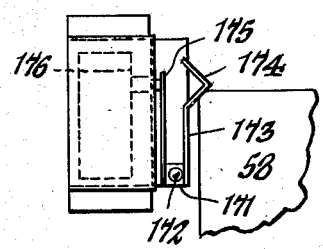
Figure 22:
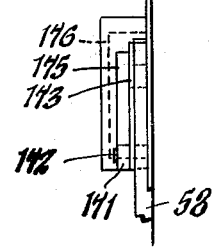
Figure 23:
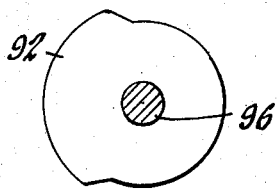
Figure 24:
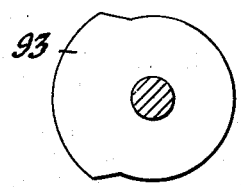
Figure 25:
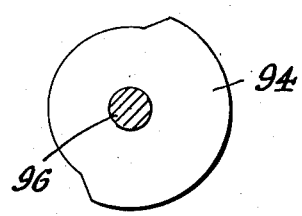
Figure 26:
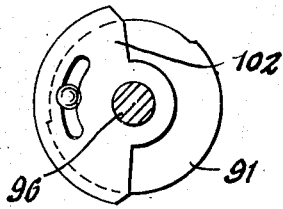
Figure 27:
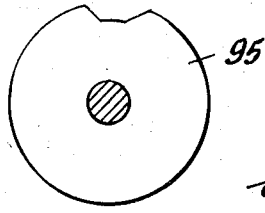
Figure 33:
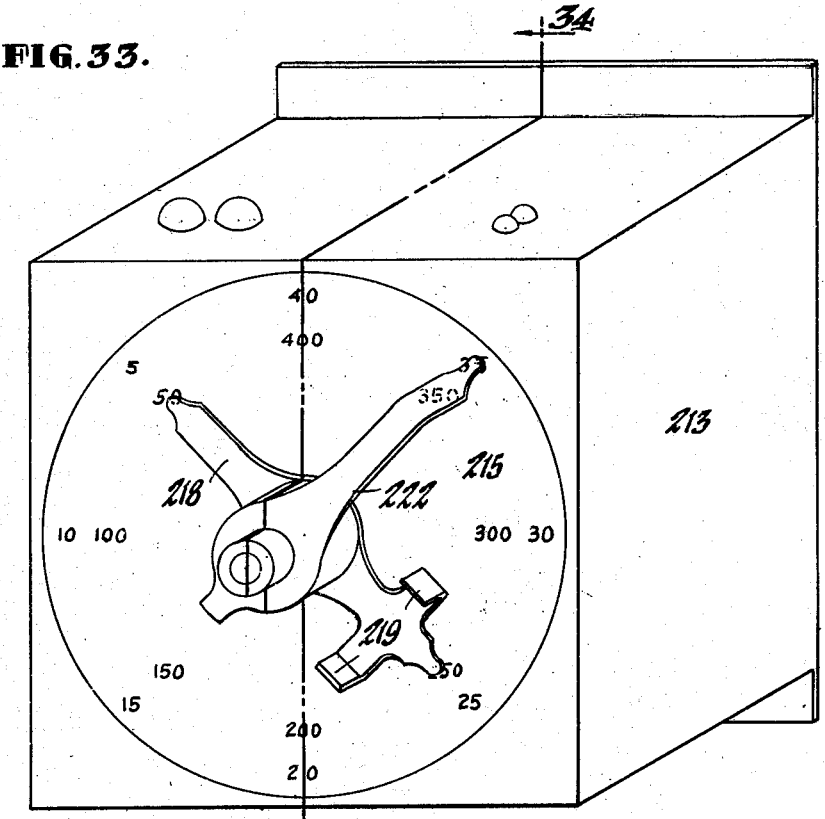
Figure 34:
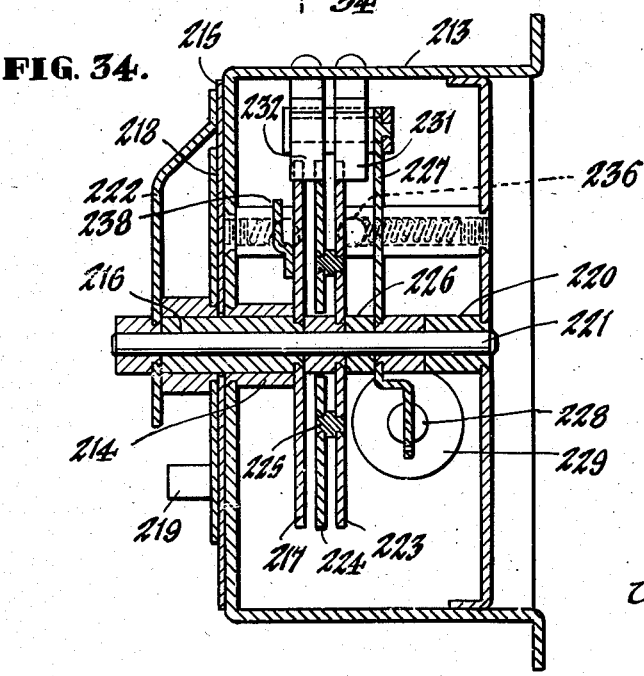
Figure 35:
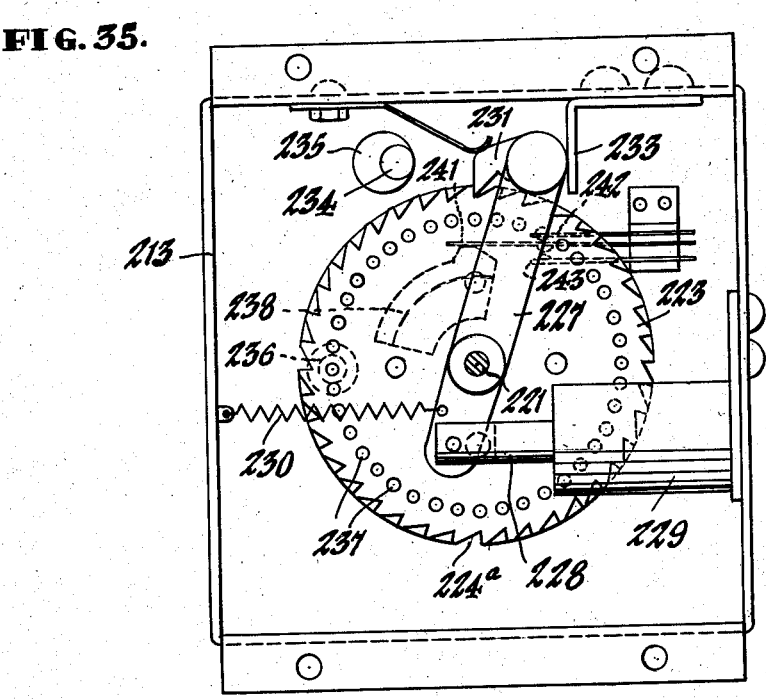
Figure 36:
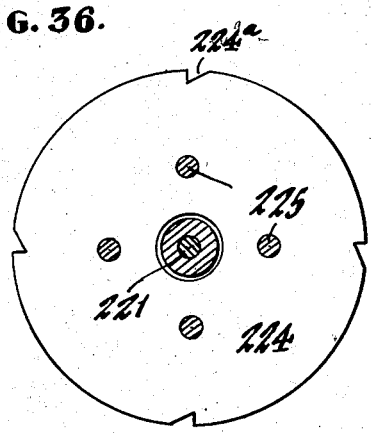
Figure 37:
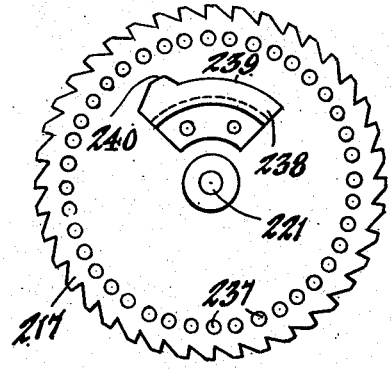
Figure 38:
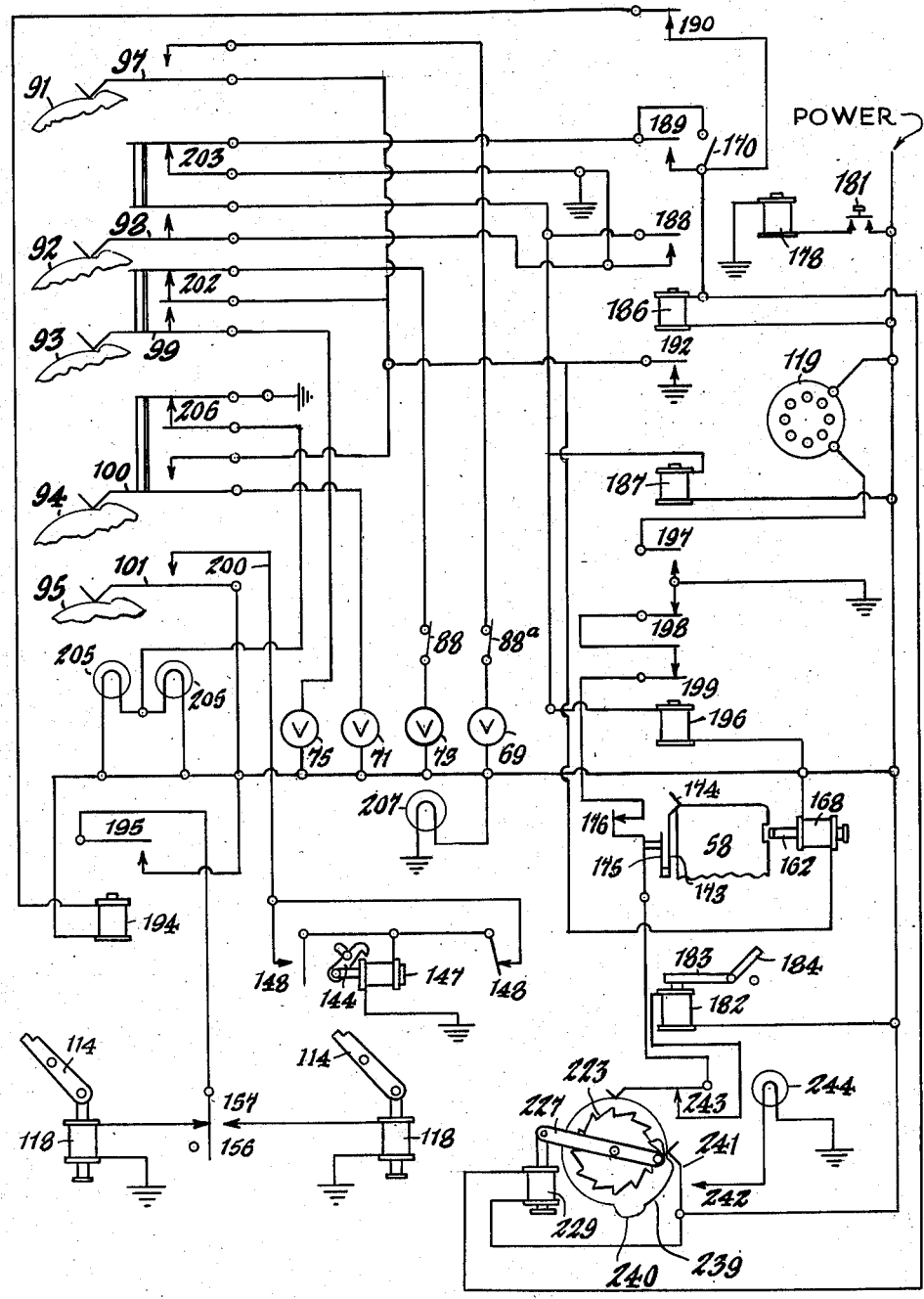

In the accompanying drawings:

Figure 1 is a front perspective view of the dispensing machine embodying my invention. Figure 2 is a front view of the refrigerating compartment within the cabinet. Figure 3 is a vertical section taken substantially on line 3—3, Figure 1. Figure 4 is an enlarged front view of the drink-measuring mechanism and its solenoid control valves, one of the latter being omitted to show the measuring chamber. Figure 5 is a bottom plan view of such mechanism. Figure 6 is an end view thereof. Figure 7 is a top plan view of the same. Figure 8 is a vertical section taken on line 8—8, Figure 7. Figure 9 is a flow diagram of the drink-measuring mechanism and associated parts. Figure 10 is an enlarged sectional elevation of one of the solenoid control valves associated with the measuring chamber. Figure 11 is an enlarged rear elevational view of the cup-dispensing mechanism and associated parts. Figure 12 is an upward continuation view of Figure 11. Figure 13 is a top plan view of the cup-dispensing mechanism. Figure 14 is a bottom plan view of the bridge plate and associated parts of the cup-dispensing mechanism. Figure 15 is an enlarged cross section taken substantially on line 15—15, Figure 11. Figure 16 is a longitudinal section taken on line 16—16, Figure 15. Figure 17 is an enlarged vertical section taken on line 17—17, Figure 11. Figure 18 is an end view of the lock mechanism associated with the vertically sliding door at the filling station. Figure 19 is a front view of the same. Figure 20 is a plan view of the same. Figure 21 is a front view of the disabling switch in operative relation to the sliding door. Figure 22 is an end view of the same. Figures 23–27, inclusive, are elevational views of the cams for controlling the various valves associated with the measuring chamber. Figure 28 is a rear view of the coin device. Figure 29 is an end view of the same. Figure 30 is a rear view of the discharge spout shield. Figure 31 is a vertical section taken on line 31—31, Figure 30. Figure 32 is a bottom plan view of such spout shield. Figure 33 is a perspective view of the drink-counting mechanism. Figure 34 is a transverse vertical section thereof taken on line 34—34, Figure 33. Figure 35 is a rear view of the counting mechanism with the rear wall removed. Figures 36 and 37 are elevational views of two of the ratchet wheels associated with the counting mechanism. Figure 38 is a wiring diagram of the electric circuit and associated parts of my dispensing mechanism.

Similar characters of reference indicate corresponding parts throughout the several views.

In its general organization, this drink or beverage vender which is coin-controlled to dispense a predetermined amount of the drink upon the deposit of a coin, comprises a refrigerated cabinet in which is housed one or more replaceable drink supply containers operatively connected to a measuring chamber from which the drink is dispensed in predetermined quantities; a fluid pressure-actuated mechanism for controlling the introduction of a predetermined amount of the beverage from the supply container to the measuring chamber and for the dispensing of the measured drink from the latter to a drink-receiving receptacle, such as a paper cup; a cup-dispensing assembly and carriage mechanism for automatically controlling the individual discharge of a cup to the carriage and for actuating the carriage to and from a position to bring a dispensed cup into filling or pouring relation with the measuring chamber; a door for normally closing the compartment in which the cup is disposed for filling and from which it is removed by the user after pouring, including means for locking the door in its closed position during the operation of pouring a drink upon the deposit of a coin, whereby access to such compartment is prevented during the pouring operation, together with door-governed means for preventing operation of the dispenser when the door is open; and a counting mechanism whereby the operator of the drink vender may know how many cupfuls of the drink have been vended and how much of the drink remains on hand in the supply containers.

The refrigerated cabinet, which is indicated generally by the numeral 40, contains an insulated compartment 41 which is spaced from the front and top side of the cabinet so as to provide a second compartment 42 which is closed at its front side by a hinged or otherwise detachable panel 43. Housed within the lower portion of the insulated compartment 41 are the drink or beverage supply tanks or reservoirs 44, two being shown in the drawings, which, in operation, are connected in series and are adapted to be installed in and removed from the same through a door 45 closing the front side of such compartment. Supported in the upper portion of this insulated compartment is a drink-measuring chamber, vessel or container 46 which is in communicating relation with one of the supply tanks to receive a predetermined measured amount of the drink therefrom for dispensing to the patron or customer upon the deposit of a coin in the coin slot 47 provided in the front panel 43 of the machine. In the upper or horizontal portion of the second compartment 42 is a refrigerating unit 48 of any well known construction having evaporator sections 49 and 50 connected thereto and disposed in the insulated compartment 41 for cooling the drink to the desired temperature. The evaporator section 49 is disposed in contiguous relation to the measuring container 46 while the companion section 50 includes a chilling chamber 51 which is connected by a pipe 52 to one of the reservoirs 44 and by a feed pipe 53 with the measuring container. A thermostatic valve 54 is provided to cut off the evaporator section 50 when the beverage in the chilling chamber reaches a temperature suitable for potability. In the upright front portion of this compartment are the cup-dispensing units or magazines 55, two being shown in the drawings, and the carriage assembly for receiving and presenting a dispensed cup into register with a pouring spout 56 which leads from the measuring chamber 46 into the cup-filling station 57 provided at the front of the machine. At its open front side this cup-filling station, which is disposed below and between the discharge ends of the cup-magazines, is closed by a vertically-sliding door 58 which is guided on the front panel 43 and which is adapted to be automatically locked during the operation of pouring a drink into the cup and to be automatically unlocked after that operation and manually opened by the patron to enable him to remove the poured drink for consumption. This sliding door is preferably made of transparent material to enable the patrons to observe the pouring operation. A spring-closed trap closure 59 is applied to the cabinet panel 43 for the purpose of readily disposing of used cups into a suitable receptacle 60 housed in the lower portion of the compartment 42. Mounted in the upper part of this cabinet-panel is a return chute or trough 61 into which both acceptable and unacceptable coins are returned to the patron, the former being returned when the machine is not in operation.

The closed drink measuring chamber 46 is designed to withstand a predetermined pressure and of a size to receive a measured quantity of the beverage from the supply tank for dispensing into a cup and its front wall may be made of a transparent material for inspection purposes. The charging of this chamber with and its discharge of a measured drink therefrom is controlled by fluid pressure, preferably air, and for this purpose a fluid pressure tank 63 and compressor 64 are located in the cabinet 40, the tank being connected by a pipe 65 containing a reducing valve 66 with one of the drink reservoirs 44 and by a branch pipe 67 for communication with the upper end of the measuring chamber. The gauge pressure employed is approximately 45 pounds per square inch. In operation the measuring chamber is preloaded to a pressure above atmospheric before the drink is admitted thereto to prevent the gaseous content of the beverage leaving the solution and forming a foam or "head" and for also preventing loss of the gaseous charge when the beverage is metered out or dispensed. Interposed in the feed pipe 53 connecting the lower end of this measuring chamber with the chilling chamber 51 is a solenoid-controlled valve 69 by which a measured amount of the cooled beverage is delivered under pressure to such measuring chamber, while leading from the lower end of the latter and constituting a part of the pouring spout 56 is a discharge pipe 70 containing a similar solenoid-controlled valve 71. The branch pipe 67, which is connected to a fluid pressure intake passage 72 opening into the upper end of the measuring chamber for pre-loading the same with fluid pressure from the tank 63, is also provided with a solenoid-controlled valve 73 which is adapted to be opened and closed at predetermined times during the operation of charging the measuring chamber with a cup of the beverage. Leading from the upper end of this measuring chamber is a vent pipe 74 having a solenoid-controlled valve 75 interposed therein for venting such container during the operation of dispensing the measured quantity of the drink therefrom. Normally the condition of the measuring chamber is that of being ready to dispense a drink and upon the deposit of a coin timing and other mechanism is brought into operation to successively open the vent valve 75 and the discharge valve 71 to cause the measured drink in the chamber to flow by gravity through the spout 56 and into a waiting cup. Thereafter, these two valves are closed and the fluid pressure intake valve 73 is opened to preload the measuring chamber with a predetermined fluid pressure, after which such valve is closed and the beverage intake valve 69 opened to deliver the predetermined amount of beverage to the chamber, at which time said intake valve is automatically closed with the parts in readiness for dispensing the next drink. These solenoid controlled valves are of any well known type and are normally held closed by springs.

As a further means of preventing loss of the charged content of the beverage while being delivered to the measuring chamber 46, I provide a baffle 76 in spaced, bridging relation over the intake port thereof which functions to spread the inflowing beverage and causes the bottom of the container to be first filled to form a cushion against which the incoming stream expends its force to eliminate any violent gushing action of the beverage and to reduce turbulence to a minimum, so that the same will rise in the container with a smooth surface and with a minimum surface tension disturbance and loss of the gaseous charge.

Suitable check valves 77 are interposed in the pipe lines connected to the beverage supply reservoirs 44 to preserve the pressure in the remainder of the system when empty reservoirs are being replaced. By using two reservoirs and connecting them in series as shown, one will be emptied before the other and the metering system will always be full and the primary purpose of this fluid-pressure control of the beverage into the measuring chamber will be further served by this arrangement. Another advantage of the dual reservoir arrangement is that one of the reservoirs is partially filled and its contents cool when the other is empty, so that when a reservoir is replaced, the unrefrigerated beverage is drawn from it drink by drink, each small quantity being mixed with a much larger quantity of the already cooled beverage. Eventually the contents of both reservoirs reach the same temperature, their pressures are balanced and the gaseous charge uniform throughout and the beverage at the optimum of palatability for drinking. Furthermore, the two steps of cooling provided, that of the refrigerated cabinet and the beverage chilling chamber 51, enables a number of drinks to be drawn in quick succession and to all be at the proper temperature of potability.

Suitable timing mechanism, hereinafter described, is provided for governing the successive opening of the solenoid-controlled, fluid pressure and beverage delivery valves 73 and 69, respectively, during the cycle of delivering a measured quantity of the beverage to the measuring chamber 46, and for both opening and closing the solenoid-controlled vent and drink-dispensing valves 75 and 71, respectively, during the cycle of pouring the measured drink into the receiving cup. The closing of the fluid pressure and beverage delivery valves is preferably governed at successive times in response to a lower, predetermined, pre-loading pressure initially admitted to the measuring chamber before the drink delivery valve 69 is opened and to a higher pressure to which such preloading pressure is subjected when a predetermined amount of the beverage has been delivered to such chamber. For this purpose a pair of fluid pressure actuated diaphragms 78, 79 is disposed in the upper or head end of the measuring chamber, the diaphragm 78 being disposed in a communicating lateral extension 80 of such chamber for actuation in response to the pre-loading pressure admitted thereto through the intake passage 72 formed in such extension, and the companion diaphragm 79 being disposed substantially axially of the chamber for actuation in response to the higher pressure created by the delivered beverage. These diaphragms are backed up by springs 81, 82 which normally urge them to a lowered position against companion bosses 83, and which are of different tensions to cause the diaphragms to be lifted in response to the different low and maximum pressures existing in the chamber. The upward displacement of these diaphragms is limited by companion sealing rings or head plates 84 applied to the top of the chamber 46 and its extension 80. Rising from each diaphragm is a thrust rod 85 guided in a bushing 86 applied to bracket 87 attached to the companion head plate 84 and having its upper end disposed for operative engagement with a companion vertically-slidable micro-switch 88 or 88$^a$ of well known construction, included in the circuit of the companion respective solenoid-controlled valve 73 or 69, and having a push button 89 in contact with the upper end of such thrust rod. A leaf spring 90 bears upon the top of each micro-switch but with insufficient pressure to open it, so that when the solenoid of the companion valve 73 or 69 is energized, such valve is opened, and remains open until the companion diaphragm 78 or 79 is lifted to cause the corresponding micro-switch 88 or 88$^a$ to open and the valve affected thereby to close. In operation the diaphragm 78, because of its lesser tensioned return spring 81, effects the closing of the fluid pressure valve 73 first for preloading the measuring chamber, while the diaphragm 79 subsequently effects the closing of the drink delivery valve 69. Upon dispensing the drink from the chamber, the diaphragms are lowered to their normal positions to again restore the micro-switches to their closed positions in preparation to the timed closing of the circuit to repeat the next filling operation, which follows immediately after the dispensing of the drink from the measuring chamber into the cup, so that when the next coin is deposited the pouring of the drink immediately follows. In practice, I have determined that, with a gauge pressure of 45 pounds in the supply reservoirs and setting the spring 81 to open the switch 88 when the pressure in passage 72 reaches 10 pounds and the spring 82 when the pressure in the measuring chamber reaches 27 pounds, the metered drink has but a single layer of bubbles on its surface.

The timing mechanism for governing the opening of the solenoid-controlled drink delivery valve 69 and the solenoid-controlled fluid pressure preloading valve 73, as well as for governing the solenoid-controlled drink-discharging and venting valves 71 and 75, respectively, may be of any suitable construction. However, as shown in the drawings, this mechanism preferably consists of a plurality of cams 91, 92, 93, 94 and 95 mounted on a cam shaft 96 and having companion multi-leaf switches 97, 98, 99, 100 and 101 in contacting engagement with the peripheries of such cams to cause the opening and closing of the switches at predetermined times. The cams 91, 92, 93 and 94 govern the drink-filling, starting and stopping, venting and pressure pre-loading, and drink-discharging operations, respectively, while the cam 95 governs the carriage mechanism, hereinafter described, for presenting the drink-receiving cups to the pouring spout 56. The filling cam 91 has a circumferentially-adjustable switch-engaging segment 102 thereon, whereby the start of the filling operation may be properly set as desired.

The cup-dispensing and carriage mechanism, whereby the cups are individually released at predetermined times from one or the other of the magazines 55 and then presented in a drink-filling position in register with the pouring spout, is preferably constructed as follows:

The cup magazines are of usual construction, each having a radial arm 103 projecting therefrom for actuation to a cup-releasing position, and being supported on a suitable framework 104 including a horizontal channel member 105 bridging the magazines with its flanges facing the front of the cabinet. Mounted on this channel member for horizontally-reciprocating movement is a slide bar 106 having one or more guide slots 107 therein engaged by a corresponding stud 108 applied to the inner face of the channel member. At one end, this slide bar has a longitudinal slot 109 through which the adjoining portion of the cam shaft 96 extends and on which such end of the slide bar is guided. Fixed on this cam shaft is a substantially heart-shaped cam 110 in the channel of which rides a follower roller 111 applied to the slide bar and whereby the latter is actuated to and from a cup-dispensing position. Extending through other slots 112 in this slide bar are the actuating arms 103 of the cup magazines and applied to the free ends of such arms are catches 113 which are held in a retracted position by a companion trigger 114 pivoted intermediate its ends at 115 on the framework adjacent to the slide bar. A spring 116 connected at one end to each catch and at its other end to the slide bar serves, when the catch is released from its trigger, to urge the companion actuating arm to a cup-dispensing position. An adjustable stop plate 117 at the inner end of each slot limits the cup-releasing stroke of the actuating arms. Operatively connected to one end of each trigger is a solenoid 118, which, when energized, swings the trigger to a released position. After a cup has been dispensed, the heart-shaped cam 110 first moves the slide bar 106 in a direction to cause the stop plate 117 to shift the actuating arm 103 to its initial position and the catch 113 in latching engagement with the trigger 114, after which the slide bar is moved in the opposite direction to tension the respective springs 116 preparatory to the next cup-dispensing operation.

The cam shaft 96 is driven from an electric motor 119, including reducing gearing, through the medium of an upright shaft 120 and worm gearing 121, 122. At its lower end this upright shaft has a bevel gear 123 meshing with a like gear 124 fixed on a horizontal driven shaft 125 for controlling the movements of the carriage mechanism to bring a dispensed cup into pouring relation with the discharge spout 56. This carriage mechanism is preferably constructed as follows:

Suspended at the lower end of the framework 104 above and parallel to the shaft 125 is a channel-like bridge plate 126 including depending bearings in which said shaft is journaled and having pairs of rollers 127 applied to the upturned flanges thereof on which is guided a longitudinally-reciprocating carriage 128 onto which the cups are dropped from the cup magazines for presentation to the filling station 57 of the machine. Surmounting and extending from end to end of the carriage is a drain plate 129 which slopes rearwardly for draining any drink spillage into a suitable trough 130 and thence through a depending pipe 131 into the cup-receptacle 60. Disposed over this drain plate is a perforated floor plate 132 onto which the cups are deposited from the respective magazines 55, such floor plate supporting a pair of cup-compartments 133 disposed side by side with each compartment of a width approximately equal to the width of the sliding door 58 which normally closes the filling station and through which but one of the compartments is visible at a time. Each compartment is provided at its upper end with a holder 134 of a shape to receive a cup as it is dispensed from one or the other of the cup-magazines and to support it clear of the floor plate 132 when empty, but to permit the descent of the cup relative thereto when filled with the drink and be effectually wedged or supported until removed by the patron.

Swively connected to the underside of the carriage 128 and depending centrally therefrom for free traversing engagement with the driven shaft 125 is a yoke 135. This shaft has opposed helical grooves 136 therein extending from end to end thereof and disposed between the hubs of the yoke for coupling engagement with the grooves in the shaft, to revolve thereon for axial movement in opposite directions, is a coupling collar 137. Mounted on the ends of a semi-circular spring 138 applied to this coupling collar and extending through diametrically-alined openings 139 formed in the latter are studs 140, 141, the stud 140 having a tongue 142 at its inner end for engagement with one or the other of the helical shaft-grooves while the companion stud 141 is arched at its inner end to engage the surface of the shaft 125. At one end thereof the coupling collar has a concentrically-disposed ratchet wheel 143 fixed thereto and cooperating therewith is a dog 144 pivoted intermediate its ends to the yoke 135 and having a spring 145 connected thereto for normally urging it into engagement with the ratchet wheel. For releasing the dog from the ratchet wheel, its free end is connected to the movable core 146 of a solenoid 147, so that when the latter is energized the dog is pivoted clear of the ratchet wheel. By this construction, assuming the dog and ratchet to be engaged, when the shaft 125 is driven, the yoke 135 with the carriage 128 is propelled lengthwise in one direction by reason of the action caused by the coupling collar 137, stud 140 and companion shaft-groove 136. Upon reaching the end or return point of the helical shaft-groove, the solenoid 147 is energized to release the dog from the ratchet, which has the effect of releasing the axial pressure of the shaft-engaging stud 140 against the coupling collar to allow the latter to revolve with the shaft under the remaining torsional pressure to bring such stud into register with the return or opposing portion of the groove. Upon again de-energizing the solenoid, the dog is engaged with the ratchet and the stud 140 follows in the opposing portion of the shaft-groove to cause the carriage to be moved in the opposite direction. When the carriage 128 reaches the end of its movement in one direction, the cup in one of its compartment-holders 134 is brought into register with the pouring spout 56, and when it reaches the end of its movement in the opposite direction the cup which had been previously dispensed into the other compartment-holder is brought into register with such spout. As each cup-compartment of the carriage is brought into cup-filling position, the companion solenoid 118 associated with the cup-dispensing assembly is energized to automatically cause a cup to be dispensed from the then alined cup magazine 55 into the empty cup-compartment 133, so that upon the next movement of the carriage in the opposite direction a cup is in readiness to receive the measured drink upon the deposit of another coin.

Located adjacent the opposite ends of movement of the carriage 128 are normally-open switches 148 which, when the carriage reaches the end of its movement in one direction or the other are adapted to be closed to energize the solenoid 147 of the carriage-reciprocating mechanism. For this purpose, a bar 149 is disposed lengthwise on the underside of the bridge plate 126 and connected thereto at its ends by screw and slot connections 150 for longitudinal sliding movement. At its ends this bar has depending lugs 151 for engagement with the companion end switches 148 and intermediate its ends this bar has a laterally-extending lug 152 to which are attached the inner ends of opposing springs 153, the outer ends of the latter being joined to the bridge plate. Substantially centrally between its ends the slide bar 149 has a longitudinal slot 154 therein which is slightly shorter than the distance traveled by the carriage in either direction and extending into this slot is the swiveled connecting pin 155 of the traveling yoke 135, so that at a point just short of the maximum travel of the carriage, this yoke-pin encounters one end or the other of such slide bar slot and moves the bar therewith to a position to alternately bring either lug 151 into position to close its companion switch 148, and retain it closed until the movement of the carriage is reversed, at which time the companion spring 153 will cause the slide bar to return to its initial position and open the switch to de-energize the solenoid 147, preparatory to the next switch-closing operation.

The switch-governing bar 149 also controls the alternate operations of the cup-dispensing solenoids 118, so that at predetermined times in the end positions of the carriage 128, one or the other of such solenoids is energized to cause the dispensing of a cup from the companion cup-magazine 55 into an awaiting cup-compartment 133. For this purpose, a leaf switch 156 is interposed in the circuit between the two solenoids and has its movable blade connected to the bar 149, as indicated at 157, to accordingly bring the switch into position to energize one or the other of the solenoids at each operating stroke of the bar.

A pair of bell crank levers 158 is pivoted to the underside of the bridge plate 126 in predetermined spaced relation lengthwise thereof and each has a roller 159 on one arm thereof for facial engagement with one or the other of the hubs of the yoke 135 and a spring 160 connected to the other arm thereof for urging said levers in a direction to exert a braking pressure on the rollers as they are engaged by the yoke. A stop pin 161 limits the spring-urged movement of each bell crank lever. By this construction, as the carriage reaches the end of its stroke in either direction, it is smoothly and uniformly arrested to accurately locate its cup-compartments 133 beneath the pouring spout 56.

Means are provided for retaining or locking the vertically-sliding door 58 in its lowered position so as to prevent access to the cup-filling station during the dispensing cycle of the machine initiated upon the deposit of a coin. By preference, this means consists of a transversely-slidable latch bar 162 suitably guided on a base plate 163 applied to the inner face of the front panel 43 of the cabinet and releasably engageable at one end with a locking notch 164 formed in the upper end of the opposing upright edge of the door 58. The other end of this latch bar is connected to spaced tie rods 165 guided on a bracket 166 applied to the base plate and connected at their outer ends to a yoke 167 attached to the core of a solenoid 168 also mounted on said base plate. Springs 169 applied to the tie rods between the bracket 166 and yoke 167 tend constantly, when the solenoid 168 is de-energized, to shift the latch bar to its retracted, unlatched position. When a coin is deposited in the machine, a coin-actuated switch 170, in the circuit of this solenoid, is caused to close to energize the latter and project the latch bar to its locked position, the circuit being maintained closed until the drink has been poured. After the drink has been poured and the cycle completed, this solenoid circuit is opened and the springs 169 act to shift the latch bar to its released position, whereby the patron may manually raise the door 58 and remove the drink from the filling station.

Means are also provided for preventing operation of the machine while the door 58 is open, and to this end I provide a switch-actuating lever 171 pivoted at 172 at one side of the door and including an arm 173 having an offset 174 at its upper end in edge bearing contact with said door and a second arm 175 in operative relation to a micro-switch 176 included in the circuit of a coin-rejecting device constituting a part of the coin-control mechanism presently to be described. By this construction, when the sliding door is opened to gain access to the cup-filling station 57, the lever 171 is rocked in a direction to open the switch 176 and the coin-rejecting device governed thereby is released, so that if any coin is deposited in the machine while the door is open, the coin is immediately returned to the patron by passage to the return chute 62 without setting the machine in operation. Hence, until the door is completely closed after withdrawing a cup of drink from the machine, the latter cannot be operated.

The coin device, which is indicated generally by the numeral 177, may be of any suitable and well known construction. However, I employ in connection with it a solenoid 178 whose core 179 is attached by a bar 180 with the scavenging lever of the coin device, so that when such solenoid is energized by depressing a push button 181 located in a convenient place at the front of the cabinet, the scavenging lever is actuated to cause coins rejected by the device to be returned to the patron through the chute 61. Also embodied in this coin device is a relay 182 whose armature 183 has an extension 184 thereon constituting a deflector adapted, under predetermined conditions, to obstruct the acceptance passage 185 of the coin device and direct the coins to the return chute 61. This relay is normally energized to withdraw the deflector 184 from the coin passage, so that acceptable coins pass on through to operate the coin switch 170 located at the terminus of such passage. When the relay is deenergized, the coin passage is obstructed so as to prevent coins from passing to the coin switch, and instead they are deflected to the return chute.

Also controlled by and included in the circuit of the coin switch 170 is an electromagnet 186 and inasmuch as the coin switch is only closed momentarily it sets this electromagnet in position to close switches associated therewith. As shown in the electric circuit diagram, the electromagnet 186, when energized closes switches 188, 189 and 190, of which the switches 188 and 189 are included in the circuit of the start and stop cam 92. The electromagnet 187, when energized, closes switch 192 included in the switching circuit governed by the timing cams 91, 93 and 94. A third electromagnet 194 is included in the circuit of the switch 190 and when energized, upon the closing of the coin switch, closes a switch 195 included in the circuit of the trigger-actuating solenoids 118 and their bar-controlled switch 156, 157 which alternately causes the release of one or the other of the solenoid-governed triggers 114 to initiate the discharge of a cup into the then awaiting compartment 133 of the carriage 128. The closing of the switch 188 establishes a circuit through the solenoid 187 to close switch 192 and energize solenoid 168 to cause the latching of the drink-filling station door 58. The closing of the switch 188 also establishes a circuit to energize a fourth electromagnet 196 to close a switch 197 for starting the motor 119 to transmit motion to the cam shaft 96 and carriage-operating shaft 125, as well as to simultaneously open a switch 198 for breaking the circuit of the coin device relay 182 to cause its deflector 184 to obstruct the coin passage of the coin device so that no coins can be effectually registered while the machine is in operation.

When the motor 119 is started as above-described, the cam shaft 96 and the carriage-operating shaft 125 are revolved, the various cams 91–95, inclusive, and their cooperating switches 97–101, inclusive, coming into operation at predetermined times. The carriage-operating cam 95 functions to close its switch 101 which is connected by a wire 200 to the limit switches 148 associated with the cup carriage assembly to energize the solenoid 147 through one or the other of its governing switches 148 when the end of the carriage stroke is reached. The energizing of this solenoid releases the dog from the ratchet 143 and causes the movement of the carriage to be arrested in cup-filling position. The vent-controlling cam 93 then closes its switch 99 to operate the solenoid valve 75 to vent the measuring chamber 46, following which the discharge-controlling cam 94 closes its switch 100 to operate the solenoid valve 71 to effect the pouring of the drink into the waiting cup in the carriage. In the meantime, cam 93 has opened switch 202 to nullify the action of switch 88 which has been closed by the release of pressure due to the action of the vent valve 75. The start and stop cam 92 now closes its switch 98 and simultaneously with that action a switch 203 is opened, the closing of the switch 98 continuing the circuit of the electro-magnet 196 to hold the switch 197 closed to keep the motor in operation. The other switch 203 interrupts the circuit through a second switch 189 to deenergize the magnet 186. Shortly before the cam 92 comes into action, the venting and discharge cams 93 and 94, respectively, return their switches to their normal positions to open the circuits of the respective valves 75 and 71 which they control. At a predetermined time, the vent cam 93 closes the switch 202 included in the circuit of the solenoid-controlled pre-loading valve 73 to admit fluid pressure into the upper end of the measuring chamber 46 until the pressure therein is sufficient to operate the switch 88 to break the circuit of this valve and cause it to close. The switch 97 controlled by the filling cam 91 now passes onto the segment 102 to make contact at 97, 201, and thereby complete the circuit through the switch 88ᵃ and filling valve 69 to allow the beverage to flow into the measuring chamber until a pressure is reached which causes this last-named switch to open, thereby causing such valve to close. Thereafter, this circuit is broken at switch 97, without further effect, by the release of the switch by cam 91. Cam 92 now completes its movement opening its switch 98 to deenergize the solenoid 168 and cause the unlocking of the door 58 to make the filled cup available to the patron. Simultaneously the electro-magnet 196 is deenergized and the motor-controlling switch 197 is opened to stop the motor 119. At substantially the same time that cam 92 opens switch 98 to end the cycle of operation, carriage cam 95 opens switch 101 to reset the circuit to solenoid 147 and switches 148 for a succeeding operation.

As shown in the electric circuit diagram, a pair of electric lamps 205 is included in the circuit controlled by the discharge cam 94 so that when a switch 206 governed thereby is opened, these lamps will be extinguished and warn the patron that the machine is in operation. Between cycles of operation, these lamps serve to illuminate that portion of the cabinet above the sliding door 58, so as to illuminate instructions applied thereto for the operation of the machine. An electric lamp 207 is included in the circuit to continuously illuminate the filling station of the machine.

Disposed at the drink-filling station 57 of the machine to shield the pouring spout 56 and effectually illuminate the cup-compartments 133 of the carriage 128, as a cup is presented to the spout for filling, is a box-like shield 208 suitably fastened to the inner side of the front panel 43 of the cabinet with its lower open edge in clearance relation to the top edges of the cup-compartments borne by the carriage and of substantially the width of one of such compartments. The rear wall 209 of this shield is made of a highly polished material and is curved so that its convex side faces forwardly while its rear concave face embraces the spout 56 with the lower end of the latter extending through an opening 210 in a rearwardly-facing flange 211 formed on such wall. In its top wall 212, this shield is fitted with the lamp 207 which serves to continuously illuminate the shield and the cup-filling station below it. The other lamps 205, which are normally lit and are automatically extinguished when the machine is in its operating cycle, are disposed over the top of this spout shield.

In order to enable the operator or proprietor of this beverage dispenser to know at a glance the amount of beverage remaining in the reservoirs 44 at any time, and enable him to know when the machine needs replenishing with the beverage, I provide an indicator or counting mechanism for indicating how many sales units, that is, cupfuls of drinks, remain on hand in the reservoirs. This mechanism is contained in a box-like housing 213 suitably mounted in the cabinet 40 for ready inspection by the proprietor or one responsible for the maintenance of the machine. Attached to the inside of the front wall of this housing substantially centrally thereof is a comparatively short bushing 214 and applied to the front face of the housing is a dial 215 having inner and outer concentric rows of figures or like indicia which, as shown in Figure 33, increase in a counter-clockwise direction. The annular row of inner figures are ten times as great in numerical value as those of the companion radially alined figures in the outer row. By way of example, the dispenser has been shown as having a capacity of 400 drinks, so that the largest reading on the dial is "400." The reference numeral 216 indicates a sleeve which is journaled in the bushing 214 and extends forwardly from the housing 213. At its inner or rear end this sleeve has a ratchet wheel 217 fixed thereto, while its front end is provided with a pointer 218 which traverses the dial 215. This pointer is double ended and its ends coincide or register with the inner row of figures on the dial. Adjacent one end this pointer has forwardly-bent, spaced lugs 219 to form a convenient means for manually setting the pointer when desired. Extending through the housing and supported at one end in the sleeve 216 and at its other end in a bearing 220 is a shaft 221 provided at its front end with a pointer 222 for traversing the outer dial-scale. Fixed on the shaft 221 in spaced relation rearwardly of the ratchet wheel 217 is a second ratchet wheel 223, and disposed between these two ratchet wheels is a third ratchet wheel 224 which revolves with the second ratchet wheel 223 and may be secured thereto by spacing rivets 225. Disposed between the bearing 220 and the ratchet wheel 223, and spaced from the latter by a spacer 226, is a pawl arm 227 whose shorter arm is connected to the core 228 of a solenoid 229 which is adapted to be energized upon the deposit of a coin in the machine for transmitting a step by step movement to the ratchet wheels and which has a spring 230 connected thereto for urging the solenoid-core to an inactive position. The longer end of the pawl arm has spring-urged pawls 231 and 232 pivoted thereto, the pawl 231 engaging the teeth of the second ratchet 223 and the companion pawl 232 bridging and engaging the teeth of both ratchet wheels 217 and 224. An adjustable stop 233 is mounted on the housing in the path of the retracting movement of the pawl-arm to regulate the length of stroke of the pawl. The movement of the pawl-arm in its opposite or driving direction is limited by a stop 234 including an eccentric 235 for readily adjusting this stop to vary the operating stroke of the pawls.

The ratchets 217 and 223 are each provided with forty teeth, while the third ratchet 224 has four teeth which are spaced at 90°, and the diameter of this latter ratchet is slightly greater than that of the ratchet 217, whereby the pawl 232 is held out of engagement with the ratchet 217 except when simultaneous movement of the ratchets 223 and 224 has brought a tooth 224ᵃ of the ratchet 224 into register with an alining tooth of ratchet 217. Thereupon pawl 232 drops into engagement with both teeth and carries ratchet wheel 217 forward one notch, when it is again held out by contact with the periphery of ratchet 224 until the next tooth 224ᵃ thereof has been brought in register therewith after ten step-by-step movements of the ratchet 223. The movements of ratchet 223 are transmitted to the pointer 222 which is revolved one-fortieth of a circle at each operation of the solenoid 229, while the companion pointer 218 is revolved one-fortieth of a circle at each tenth movement of the pointer 222. The solenoid is energized once for each passage of a legitimate coin through the coin device and it will be understood that the pointer 222 is moved in a clockwise direction from a higher number to the next lower number, and at each tenth operation the companion pointer 218 is moved from a given number to the next number ten units smaller. Thus, as each cup or sales unit drink is vended it is subtracted from the total number of units or drinks in the reservoirs, and the pointers always indicate the number of such unit drinks remaining in the machine to be vended.

Let it be assumed that both beverage reservoirs 44 each contain 200 sales units or drinks or a total of 400 drinks. Thus, when one reservoir has been emptied and 147 drinks vended from the other, the drink-counting mechanism will indicate a remainder of 53 drinks in the other reservoir. At this time pointer 218 will register with the number "50" on the inner dial scale and the companion pointer 222 will register "3" on the outer dial scale, and the lugged end of the pointer 218 will register with the number "250" on the inner scale. After the attendant installs a new reservoir containing 200 drinks in the machine, he grasps the lugs 219 of the pointer 218 and moves it 180° to bring it into register with the number "250" on the inner dial scale. Thus, the counting mechanism will indicate a supply of 253 drinks in the machine.

Spring-pressed detents 236 are suitably mounted in the housing 213 for releasable engagement with companion openings 237 in the ratchet wheels 217 and 223 respectively, for releasably retaining them in their advanced positions.

Attached to the face of the ratchet wheel 217 is a switch-governing cam 238 having a comparatively long leading edge 239 and a comparatively short trailing edge 240 of a greater radius than the first-named edge. In the revolving path of this cam is a multi-leaf switch consisting of an intermediate cam-engaging leaf 241 and contact switch leaves 242 and 243 so arranged that when the contact 242 is closed by the leading edge 239 of the cam, the companion switch contact 243 remains closed, and when contact with the trailing edge 240 of the cam is made the switch contact 243 is opened while the companion switch contact 242 remains closed. In practice, I prefer to have the switch contact 242 closed when the pointer 218 indicates a remaining stock of 50 drinks in the machine, and to have the companion switch contact 243 open when 10 drinks remain. The switch contact 242 is included in the circuit of a warning lamp 244 which accordingly is illuminated when a stock of 50 drinks remains. The companion switch contact 243 is preferably opened when the supply of the beverage has decreased to a point at which the chilling tank 51 and connecting pipes are filled. When this latter switch is opened, it disables the coin device in the same manner as the switch 176 controlled by the opening of the sliding door 58, and for this purpose this switch contact 243 is included in the circuit of the relay 182, to thereby prevent the machine from delivering further drinks until it has been replenished with beverage. When the counting mechanism is reset after the installation of additional beverage tanks, the warning lamp 244 is extinguished and the relay 182 is energized and the machine is in readiness to accept coins to dispense the beverage in measured quantities.

When a coin is deposited switch 170 is closed, momentarily energizing solenoids 186 and 229, causing switches 188, 189 and 190 to close and power to flow through switches 203 and 189 to keep solenoid 186 energized until switch 203 is opened by cam 92. Switch 190 energizes solenoid 194 which through switch 195 applies voltage to the cup dispensing solenoid 118 to drop a cup into the carriage. Closing of switch 188 causes solenoids 196 and 187 to be energized and remain energized during the complete cycling operation due to switch 98 closing and switch 203 opening, causing solenoid 186 to be de-energized. Closing of switch 192 completes or prepares the circuits to switches 202, 97, 100 and 99, and also energizes solenoid 168 which latches the door 58 during the dispensing cycle. When switch 198 is opened, due to solenoid 196 being energized, solenoid 182 is de-energized causing coins to be returned; also switch 197 is closed, starting the motor 119 to drive the cams and other dispensing parts. Switches 198, 176, and 243 are in series and the opening of any one of these switches causes the machine to return coins to the patron.

The cams operate as follows:

Carriage cam 95 closes its switch causing the carriage to perform its duties. The next cam 93 now opens switch 202, thus stopping air from entering the measuring chamber and also closes switch 99, causing the air in measuring chamber to be vented. Directly after closing of contacts 99, discharge cam 94 causes contacts 206 to open and lights 205 go out during the pouring of the drink; also contacts 100 close to cause discharge valve 71 to open and pour the drink. After the drink is poured contacts 100 open and contacts 202 close causing the air valve 73 to open and preload the measuring chamber with air controlled by the switch 88. Fill cam 91 now causes switch 97 to close and open fill valve 69, allowing liquid to fill the chamber until switch 88ª opens the circuit, thus closing the valve 69, after which switch 97 is reopened. At an intermediate point in the cycle, cam 92 opens switch 203 to break the initial holding circuit to solenoid 186, causing solenoids 229, 186 and 194 to be deenergized, and closes switch 98 to provide a holding circuit for solenoids 187 and 196 to maintain the door locked, the valve circuits energized and the motor in operation. At the end of the cycle, cam 95 releases switch 101 and cam 92 breaks the second holding circuit at switch 98 to stop the motor and restore the machine to initial condition.

I claim as my invention:

1. A drink vending apparatus, comprising a drink measuring chamber adapted for connection to a source of drink supply and having a discharge from which the measured drink is poured, valves for controlling the introduction of the drink to and its discharge from the measuring chamber, means including a valve control for introducing a fluid pressure to said measuring chamber for predetermining the amount of drink delivered thereto from the supply source, and diaphragm-like means exposed to the fluid pressure in said measuring chamber and companion to said fluid pressure and drink-introducing valves and responsive to the fluid pressure introduced into said chamber for governing at predetermined times the closing of the fluid-pressure control valve and the valve for controlling the introduction of the drink to the measuring chamber.

2. A drink vending apparatus, comprising a drink measuring chamber adapted for connection to a source of drink supply and having a discharge from which the measured drink is poured, valves for controlling the introduction of the drink to and its discharge from the measuring chamber, means including a control valve for introducing a fluid pressure to said measuring chamber for predetermining the amount of drink delivered thereto from the supply source, means companion to said fluid pressure and drink-introducing valves and responsive to the fluid pressure introduced into said chamber for governing at predetermined times and at different pressures the closing of the fluid pressure control valve and the valve for controlling the introduction of the drink to the measuring chamber, and means operatively connected to such valves for automatically opening them at predetermined times.

3. A drink vending apparatus, comprising a drink supply tank, a measuring chamber, a source of fluid pressure in communicating relation with the drink supply tank and the measuring chamber for governing the delivery of the drink from the former to the latter, automatic valve means for controlling the admission of fluid pressure and the delivery of the drink to said measuring chamber, and timed actuated means for opening said valve means, said valve means including devices governed by the fluid pressure admitted to the chamber to shut off the supply of such pressure and the drink to said measuring chamber respectively, when the pressure in the chamber reaches a predetermined condition and when the chamber has received a predetermined measured quantity of the drink.

4. A drink vending apparatus, comprising a drink supply tank, a measuring chamber, a source of fluid pressure, valved intake means for delivering the drink under fluid pressure from the supply tank to the measuring chamber, valved intake means for delivering fluid pressure to said chamber to pre-load it prior to the delivery of the drink to the measuring chamber, valved means for venting said chamber and for discharging the measured drink therefrom, and means correlated with said valved intake means, respectively, for governing the closing thereof when the fluid pressure delivered to said chamber reaches a predetermined pre-loading point and when such fluid pressure reaches a predetermined loading pressure as determined by the amount of drink delivered to said chamber.

5. A drink vending apparatus, comprising a measuring chamber having a valved intake for the delivery of the drink thereto, a valved outlet for discharging the measured drink, a valved outlet constituting a vent, and a valved intake for the delivery of fluid pressure thereto, means operatively connected to the valves of said intakes and said outlets for actuating them at predetermined times to an open position, and means for automatically governing the closing of said valved fluid pressure and drink intakes, including diaphragm-actuated devices exposed to the fluid pressure in said measuring chamber and responsive, respectively, to different predetermined pressures to initiate the successive closing of said valved intakes to govern the amount of the drink delivered to said chamber.

6. A drink vending apparatus, comprising a measuring chamber having a valved intake for the delivery of the drink thereto, a valved outlet for discharging the measured drink, a valved outlet constituting a vent and a valved intake for the delivery of fluid pressure thereto, automatic means including solenoid devices and timing mechanism thereof correlated with said valved elements for successively controlling the dispensing of a measured drink from said chamber upon the predetermined opening of said valved outlets and the refilling of said chamber with a measured drink upon the predetermined opening of said valved inlets, and fluid pressure responsive devices disposed in said chamber and correlated with said valved fluid pressure and drink intakes for successively closing the same to govern the amount of the drink delivered to said chamber.

7. A drink vending apparatus, comprising a drink supply tank, a measuring chamber in communication with said supply tank, a valve for controlling the flow of drink to said chamber, a fluid pressure supply tank in communication with said drink supply tank and with said measuring chamber, a valve disposed between said fluid pressure tank and the measuring chamber, and diaphragm-like means exposed to the fluid pressure in said measuring chamber and in operative relation to the latter and in governing relation to the valves between the measuring chamber and the drink supply and fluid pressure supply tanks, respectively, for automatically controlling the duration of opening of such valves to predetermine the measured amount of the drink delivered from the drink supply tank to the measuring chamber, one of said diaphragm-like means being responsive to a low pressure condition in the measuring chamber and the other to a maximum pressure existing therein.

8. A drink vending apparatus, comprising a drink supply tank, a measuring chamber in communicating relation with said tank to receive a predetermined quantity of the drink therefrom for dispensing, a source of fluid pressure connected to the supply tank and to the measuring chamber for delivering the drink to the latter under pressure and for preloading said chamber with fluid pressure, normally closed valves for controlling the admission of the drink and fluid pressure to said measuring chamber, means operatively connected to said valves for causing them to open at different times, and fluid pressure responsive devices in said chamber one for each valve, for controlling their duration of opening as determined by the preloading fluid pressure delivered to the measuring chamber and the head pressure therein upon delivering the drink thereto.

9. A drink vending apparatus, comprising a drink supply tank, a measuring chamber having a pouring spout and in communicating relation with said tank to receive a predetermined quantity of the drink therefrom for dispensing, a source of fluid pressure connected to the supply tank and to the measuring chamber for delivering the drink to the latter under pressure and for preloading said chamber with fluid pressure, normally closed valves for controlling the admission of the drink and fluid pressure to said measuring chamber, means operatively connected to said valves for causing them to open in predetermined timed relation, and means governed by the fluid pressure introduced into said chamber for causing the closing of said valves in predetermined order to control the admission of a measured quantity of the drink to such chamber.

10. A drink vending apparatus, comprising a drink supply tank, a measuring chamber in communicating relation with said tank to receive a predetermined quantity of the drink therefrom for dispensing, a source of fluid pressure connected to the supply tank and to the measuring chamber for delivering the drink to the latter under pressure and for preloading said chamber with fluid pressure, valves for controlling the delivery of the fluid pressure and the drink to said measuring chamber, electric means operatively connected to said valves for selectively opening them, and means operatively connected to said valve-opening means and responsive to the fluid pressure in the measuring chamber for governing the duration of opening of said valves, the fluid pressure delivery valve being caused to close when a predetermined preloading pressure in said chamber is reached and the companion drink-delivery valve being caused to close when a predetermined loading pressure in said chamber is reached.

11. A drink vending apparatus, comprising a measuring chamber having a valved intake for the delivery of the drink thereto, a valved outlet for discharging the measured drink, a valved outlet constituting a vent, and a valved intake for the delivery of fluid pressure thereto, means operatively connected to the valves of said intakes and said outlets for selectively actuating them at predetermined times from a normally-urged closed position to an open position, and fluid pressure responsive devices disposed in said chamber in correlation with said fluid pressure and drink intake valves and operatively connected with the actuating means thereof for causing such valves to close, the fluid pressure responsive device correlated with the fluid pressure intake valve causing the same to close at a comparative low pressure prior to the opening of the drink intake valve, and the companion fluid pressure device correlated with said drink intake valve causing the closing of its valve at a higher pressure when the predetermined measured amount of the drink has been delivered into said chamber.

12. A drink vending apparatus, comprising a measuring chamber having a valved intake for the delivery of the drink thereto, a valved outlet for discharging the measured drink, a valved outlet constituting a vent, and a valved intake for the delivery of fluid pressure thereto, electro-mechanical, timed controlling means operatively connected to the valves of said intakes and said outlets for selectively actuating them from a normally-urged closed position to an open position, and electro-pneumatic governing means correlated with the controlling means of the fluid pressure and drink intake valves and operative in response to different fluid pressure conditions in said chamber for successively causing the closing of the fluid pressure intake valve before the opening of the drink intake valve and the closing of the latter when the measured quantity of the drink has been delivered to said chamber as determined by said electro-pneumatic governing means.

13. A drink dispensing apparatus, comprising a plurality of drink supply containers connected in series, a measuring chamber connected to one of the series-connected supply containers, the other container and said measuring chamber being adapted for communication with a source of fluid pressure, valves for controlling the admission of the fluid pressure and the drink to the measuring chamber and including means for opening them at predetermined times, means governed by the fluid pressure introduced into said chamber for causing the closing of said valves in predetermined order to control the admission of a measured quantity of the drink to such chamber, and a discharge spout for dispensing the measured drink.

14. A drink dispensing apparatus, comprising a plurality of drink supply containers connected in series, a measuring chamber connected to one of the series-connected supply containers, the other container and said measuring chamber being adapted for communication with a source of fluid pressure, a chilling chamber interposed between the first-named supply container and the measuring chamber, the fluid pressure acting on the drink in the supply container to force the same to the chilling chamber and the measuring chamber valves for controlling the admission of the fluid pressure and the drink to the measuring chamber and for controlling the venting of the latter and the dispensing of the measured drink therefrom, and means operatively connected to said valves for automatically governing the same in a predetermined order and at predetermined times to vent the measuring chamber, to dispense the drink therefrom, to preload said measuring chamber with a supply of fluid pressure below that existing in the supply containers, and to thereafter admit a quantity of the drink from the chilling chamber to the measuring chamber, respectively.

15. A drink dispensing apparatus, comprising a drink-receiving chamber having a discharge spout through which the drink is poured, a cup magazine including a part to be actuated for releasing a cup therefrom, a cup-receiving carriage for receiving a released cup from the magazine and presenting it into register with the pouring spout, means connected to the carriage for reciprocating it to its cup-receiving and cup-pouring positions, shiftable means disposed for operative engagement with the carriage at predetermined times in its movement for governing said carriage-reciprocating means to move the carriage in one direction or the other, means operatively connected to said cup-releasing part for governing the dispensing of a cup therefrom onto the carriage at a predetermined time in its movement, and an operative connection between said shiftable means and said cup-dispensing means for initiating, at a predetermined time in the movement of the carriage, the actuation of the actuatable part of the cup magazine to a cup-dispensing position.

16. A drink vending apparatus, comprising a cabinet having a cup-filling station therein, a manually-operated door for closing said station against access by the patron during the pouring of a drink, drink-dispensing means for pouring a measured quantity of the drink into a cup, coin-controlled means for rendering said dispensing means operative, latching means for the door, means for normally urging said latching means to an unlatched position, and means operatively connected to said coin-controlled means and rendered operative by the latter upon the deposit of a coin to project the latching means to its door-latching position.

17. A drink vending apparatus, comprising a cabinet having a cup-filling station therein, a door for closing said station against access by the patron during the pouring of a drink, drink-dispensing means for pouring a measured quantity of the drink into a cup, coin-controlled means for rendering said dispensing means operative, a latch applied to the door, means for normally urging said latch to an unlatched position, and means operatively connected to said latch and in governing relation to said coin-controlled means and said drink-dispensing means for automatically projecting said latch to a locked position upon the deposit of a coin and for maintaining it in such position during the operation of the drink-dispensing means, said latch-governing means being rendered inoperative upon the completion of the pouring of a drink to cause said latch-urging means to restore the latch to its unlatched position.

18. A drink vending apparatus, comprising a drink measuring chamber having valved inlets for the introduction of the drink to be dispensed and for a fluid pressure medium and a valved outlet for the discharge of the measured drink, means for effecting the opening of said valved inlets at predetermined times to successively introduce the fluid pressure medium and the drink to said chamber, means disposed in pressure responsive relation to said chamber and operatively connected to the fluid pressure introducing valved inlet for closing the same when the pressure in said chamber reaches a given pre-loading condition, and a second means disposed in pressure responsive relation to said chamber and operatively connected to the drink-introducing valved inlet for closing the same when a measured quantity of the drink has been introduced into the chamber as determined by the head pressure in said chamber.

19. A drink vending apparatus, comprising a cabinet having a cup-filling station therein, a manually-operated door for closing said station against access by the patron during the pouring of a drink, drink-dispensing means for pouring a measured quantity of the drink into a cup, coin-controlled means for rendering said dispensing means operative, latching means for the door, means for normally urging said latching means to an unlatched position, an electric circuit including said coin-controlled means, a solenoid in said circuit operatively connected to said latching means for shifting the latter to its latched position when the solenoid is energized, and a coin-controlled switch in said circuit and rendered operative upon the deposit of a coin for initiating its closing.

20. A drink vending apparatus, comprising a cabinet having a cup-filling station therein, a manually-operated door for closing said station against access by the patron during the pouring of a drink, drink-dispensing means for pouring a measured quantity of the drink into a cup, coin-controlled means for rendering said dispensing means operative, latching means for the door, means for normally urging said latching means to an unlatched position, an electric circuit including said coin-controlled means, a solenoid in said circuit operatively connected to said latching means for shifting the latter to its latched position when the solenoid is energized, a coin-controlled switch in said circuit and rendered operative upon the deposit of a coin for initiating its closing, and other switch means in said circuit governed by said drink-dispensing means for maintaining the circuit closed during the pouring of a drink and for effecting its opening after the pouring operation.

21. A drink vending apparatus, comprising a drink-dispensing mechanism adapted to pour a measured amount of the drink, coin-operated means for rendering said mechanism operative to pour a drink, a coin device including a movable coin deflector in the coin passage thereof and normally disposed in a position for permitting the travel of a deposited coin therethrough for rendering the coin-operated means operative to cause the pouring of a drink, means defining a pouring station to which a cup is presented for receiving the measured amount of the drink, a door for closing said station against access by the patron during pouring of a drink, latching means for the door, means connected to said latching means for normally urging it to an unlatched position, means rendered operative upon the deposit of a coin to project the latching means to its latching position and maintaining it latched during the pouring of the drink, and means disposed in operative relation to the door and in governing relation to said coin deflector for initiating the movement of the latter from its normal position to a coin-deflecting position when the door is open.

22. A drink vending apparatus, comprising a drink supply tank, a measuring chamber, a source of fluid pressure in communicating relation with the drink supply tank and the measuring chamber for governing the delivery of the drink from the former to the latter, fluid pressure and drink-valves for said chamber, means operatively connected to said valves, respectively, for opening the same at predetermined times to successively introduce a pre-loading fluid pressure and the drink to said chamber, and fluid-pressure governed means exposed to said chamber and operatively connected to said valves for selectively controlling the closing thereof in response to the admission of predetermined volumes of fluid pressure and dring to the measuring chamber.

23. A drink vending apparatus, comprising a measuring chamber having a valved intake for the delivery of the drink thereto, a valved outlet for discharging the measured drink, a valved outlet constituting a vent, and a valved intake for the delivery of fluid pressure thereto, means operatively connected to the valves of said intakes and said outlets for actuating them at predetermined times to an open position, and pressure-controlled means exposed to the fluid pressure in said measuring chamber for automatically governing the closing of said valved fluid pressure and drink intakes, respectively, and responsive to different predetermined pressures existing in the chamber to successively initiate the closing of said valved intakes to govern the amount of drink delivered to said chamber.

WALTER VON STOESER.

REFERENCES CITED

The following references are of record in the file of this patent:

UNITED STATES PATENTS

| Number | Name | Date |
|---|---|---|
| 1,789,064 | Borislavsky et al. | Jan. 13, 1931 |
| 1,895,745 | Asenbaum | Jan. 31, 1933 |
| 1,973,167 | Heine | Sept. 11, 1934 |
| 2,000,556 | Brady | May 7, 1935 |
| 2,082,534 | Bondurant | June 1, 1937 |
| 2,189,740 | Mills | Feb. 6, 1940 |
| 2,261,338 | Carlson | Nov. 4, 1941 |
| 2,264,738 | Blann | Dec. 2, 1941 |
| 2,284,880 | Nicholson | June 2, 1942 |
| 2,345,937 | Joa | Apr. 4, 1944 |